(12) United States Patent
Zimmerman

(10) Patent No.: US 11,542,980 B2
(45) Date of Patent: Jan. 3, 2023

(54) UNIVERSAL QUICK-RELEASE ANCHOR MEMBER

(71) Applicant: Israel Harry Zimmerman, Los Angeles, CA (US)

(72) Inventor: Israel Harry Zimmerman, Los Angeles, CA (US)

(*) Notice: Subject to any disclaimer, the term of this patent is extended or adjusted under 35 U.S.C. 154(b) by 0 days.

(21) Appl. No.: 17/137,673

(22) Filed: Dec. 30, 2020

(65) Prior Publication Data
US 2022/0205473 A1 Jun. 30, 2022

(51) Int. Cl.
*F16B 47/00* (2006.01)

(52) U.S. Cl.
CPC .................................. *F16B 47/00* (2013.01)

(58) Field of Classification Search
CPC ...................................................... F16B 47/00
USPC ... 248/206.2, 467, 537, 205.5, 205.8, 309.3, 248/362, 363
See application file for complete search history.

(56) References Cited

U.S. PATENT DOCUMENTS

| | | |
|---|---|---|
| 1,518,943 A | 12/1924 | Story |
| 1,753,611 A | 4/1930 | Lower |
| 1,778,175 A | 10/1930 | Thune |
| 1,840,400 A | 1/1932 | Lebherz |
| 2,083,299 A | 6/1937 | Hunter |
| 2,233,870 A | 3/1941 | Muter |
| 2,542,400 A | 2/1951 | Donofrio |
| 2,565,793 A | 8/1951 | Weismantel |
| 2,601,279 A | 6/1952 | Hacus |
| 2,740,545 A | 9/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |
| 2,936,139 A | 5/1960 | Lindstrom |
| 2,963,256 A | 12/1960 | Borah |
| 2,968,888 A | 1/1961 | Borah |
| 3,094,235 A | 6/1963 | Lunning |
| 3,159,370 A | 12/1964 | Rubinstein |
| 3,383,001 A | 5/1968 | Wei |

(Continued)

FOREIGN PATENT DOCUMENTS

| | | |
|---|---|---|
| CN | 1079886 A1 | 12/1993 |
| CN | 203987324 U | 12/2014 |

(Continued)

*Primary Examiner* — Muhammad Ijaz
(74) *Attorney, Agent, or Firm* — Walter W. Duft

(57) ABSTRACT

A universal quick-release anchor member includes a flexible base seal member comprising non-porous resilient material. The base seal member is configured to engage an external reference surface and form a substantially airtight seal therewith that defines a controlled pressure zone. A vent port extends through the anchor member. A vent port closure member is disposed proximate to a vent port upper end. The vent port closure member is biased to move from a closed position to an open position. The closed position includes the vent port closure member being arranged to block the vent port upper end and prevent the passage of air through the vent port. The open position includes the vent port closure member being arranged to unblock the vent port upper end and allow the passage of air through the vent port.

20 Claims, 16 Drawing Sheets

(56) References Cited

U.S. PATENT DOCUMENTS

| | | | |
|---|---|---|---|
| 3,675,886 A | 7/1972 | Kampmier | |
| 3,847,324 A | 11/1974 | Uchanski et al. | |
| 4,040,549 A | 8/1977 | Sadler | |
| 4,127,211 A | 11/1978 | Zerbey | |
| 4,133,575 A | 1/1979 | Mader | |
| 4,137,356 A | 1/1979 | Shoemaker et al. | |
| 4,726,553 A | 2/1988 | Wischusen, III | |
| 4,756,497 A * | 7/1988 | Lan | F16B 47/00 248/346.11 |
| 4,759,525 A | 7/1988 | Cross et al. | |
| 4,760,987 A | 8/1988 | Lan | |
| 4,836,488 A | 6/1989 | Ross | |
| 4,872,721 A | 10/1989 | Sniadach | |
| 4,890,760 A | 1/1990 | Nicoll, Sr. et al. | |
| 4,928,848 A | 5/1990 | Ballway | |
| 4,940,138 A | 7/1990 | Hornstein | |
| 4,941,635 A | 7/1990 | Lan | |
| 4,955,493 A | 9/1990 | Touzani | |
| 4,978,566 A | 12/1990 | Scheurer et al. | |
| 5,040,719 A | 8/1991 | Ballway | |
| 5,065,973 A | 11/1991 | Wang | |
| 5,071,096 A | 12/1991 | Hartman et al. | |
| 5,076,527 A | 12/1991 | Yung-Huei | |
| 5,133,524 A | 7/1992 | Liu | |
| 5,180,132 A | 1/1993 | Pearson et al. | |
| 5,186,350 A | 2/1993 | McBride | |
| 5,190,332 A * | 3/1993 | Nagai | B65G 47/91 271/90 |
| 5,192,043 A | 3/1993 | Fa | |
| 5,207,076 A | 5/1993 | Sciarrillo | |
| 5,213,385 A * | 5/1993 | Nagai | F16B 47/00 294/189 |
| 5,273,182 A | 12/1993 | Laybourne | |
| 5,282,541 A | 2/1994 | Chen | |
| 5,292,140 A | 3/1994 | Laing | |
| 5,381,990 A * | 1/1995 | Belokin | F16B 47/00 248/362 |
| D357,170 S | 4/1995 | Wellsfry | |
| 5,413,302 A | 5/1995 | Ferster | |
| 5,511,752 A * | 4/1996 | Trethewey | B25B 11/007 248/205.8 |
| 5,531,353 A | 7/1996 | Ward et al. | |
| 5,667,180 A | 9/1997 | Duckworth | |
| 5,742,971 A | 4/1998 | Salinger | |
| D397,915 S | 9/1998 | McNaughton | |
| D400,763 S | 11/1998 | Taylor et al. | |
| 5,992,806 A | 11/1999 | Adams | |
| 6,000,575 A | 12/1999 | LaCour et al. | |
| 6,039,206 A | 3/2000 | DeFrancesco | |
| 6,059,138 A | 5/2000 | Labruyere | |
| D439,116 S | 3/2001 | White | |
| 6,264,054 B1 | 7/2001 | Miyake et al. | |
| 6,315,153 B1 | 11/2001 | Osborn | |
| 6,318,683 B1 | 11/2001 | Savoy | |
| 6,367,652 B1 | 4/2002 | Toida et al. | |
| 6,439,418 B1 | 8/2002 | Immerman et al. | |
| 6,491,265 B2 | 12/2002 | Tracy | |
| 6,497,394 B1 | 12/2002 | Dunchock | |
| 6,511,031 B2 | 1/2003 | Lin | |
| 6,520,368 B1 | 2/2003 | Chiu | |
| 6,543,637 B1 | 4/2003 | Osborn | |
| 6,571,976 B1 | 6/2003 | Sonnabend | |
| 6,596,374 B1 | 7/2003 | Adjeleian | |
| 6,666,420 B1 | 12/2003 | Carnevali | |
| 6,745,987 B2 | 6/2004 | Rousselet et al. | |
| 6,776,368 B1 | 8/2004 | Duncan et al. | |
| 6,895,642 B2 | 5/2005 | Huang | |
| 7,090,183 B2 | 8/2006 | Heybl et al. | |
| 7,201,285 B2 | 4/2007 | Beggins | |
| 7,306,113 B2 | 12/2007 | El-Saden et al. | |
| 7,458,541 B1 | 12/2008 | Chang | |
| 7,481,329 B2 | 1/2009 | Camp, Jr. | |
| 7,726,715 B2 | 6/2010 | Nagasawa et al. | |
| 8,025,169 B2 | 9/2011 | Zimmerman | |
| 8,028,850 B2 | 10/2011 | Zimmerman | |
| 8,272,523 B1 | 9/2012 | Demusis, Sr. | |
| 8,534,633 B2 * | 9/2013 | Tell | B25J 15/0616 248/205.8 |
| 8,757,418 B2 | 6/2014 | Zimmerman | |
| 9,521,919 B1 | 12/2016 | Reyes | |
| 9,651,229 B1 | 5/2017 | Huang | |
| 9,801,483 B2 | 10/2017 | D'Alesio | |
| 9,814,332 B2 | 11/2017 | Zimmerman | |
| 10,520,009 B2 | 12/2019 | Smith et al. | |
| 2002/0130133 A1 | 9/2002 | Immerman et al. | |
| 2003/0075666 A1 | 4/2003 | Dunchock | |
| 2003/0102320 A1 | 6/2003 | Park | |
| 2004/0178315 A1 * | 9/2004 | Lee | F16B 47/00 248/363 |
| 2004/0238541 A1 | 12/2004 | Camp, Jr. | |
| 2004/0238542 A1 | 12/2004 | Camp, Jr. et al. | |
| 2006/0175506 A1 | 8/2006 | Lan | |
| 2007/0012706 A1 | 1/2007 | Deadman | |
| 2007/0205205 A1 | 9/2007 | Kliewer | |
| 2008/0093370 A1 | 4/2008 | Darsey | |
| 2008/0190948 A1 | 8/2008 | Sayasithsena | |
| 2009/0250467 A1 | 10/2009 | Schmidt | |
| 2009/0256043 A1 | 10/2009 | Lan | |
| 2014/0326630 A1 | 11/2014 | Henry | |
| 2015/0230638 A1 | 8/2015 | Jagger | |
| 2016/0258471 A1 * | 9/2016 | Orban | F16B 47/00 |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204500194 U | 4/2015 |
| CN | 105996667 A | 10/2016 |
| DE | 3742636 | 1/1989 |
| EP | 1649788 | 4/2006 |
| JP | H05187430 A | 7/1993 |
| JP | 2000104724 A | 4/2000 |
| JP | 2003501315 | 1/2003 |
| JP | 2004160079 | 10/2004 |
| JP | 2006314739 | 11/2006 |
| WO | WO2012008942 | 1/2012 |
| WO | WO2019097212 A1 | 5/2019 |

* cited by examiner

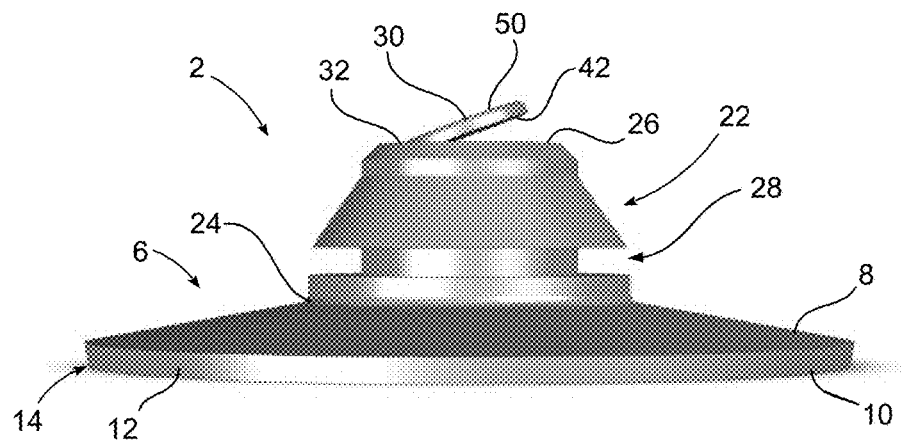
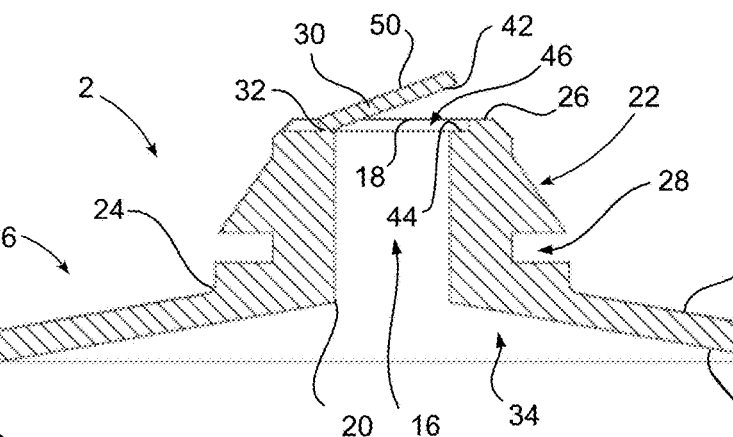
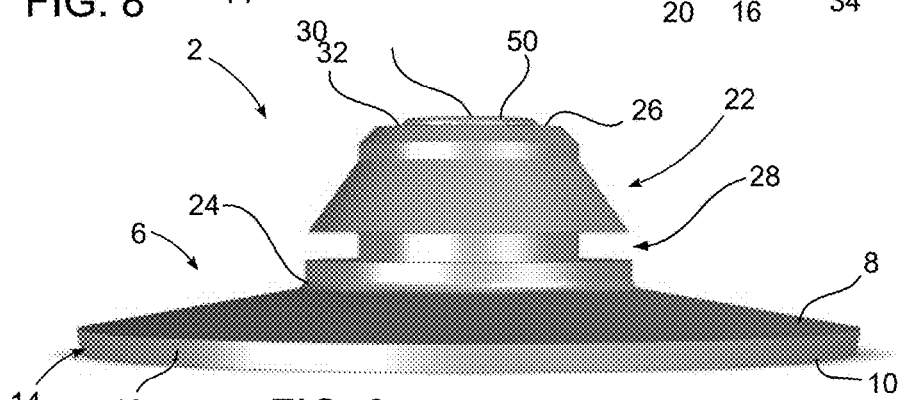
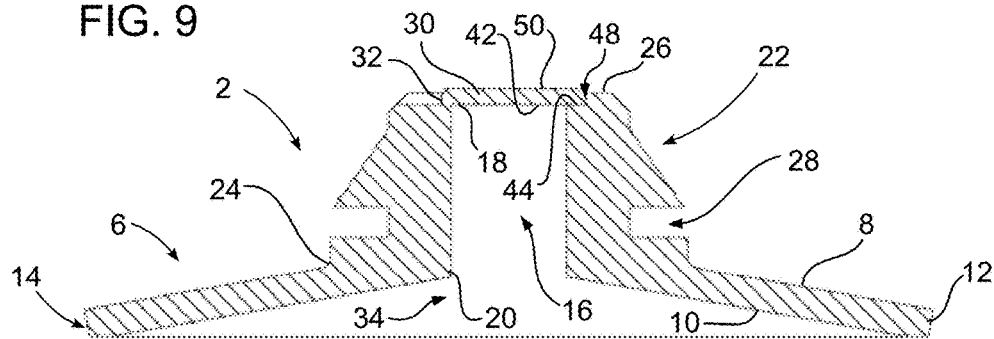

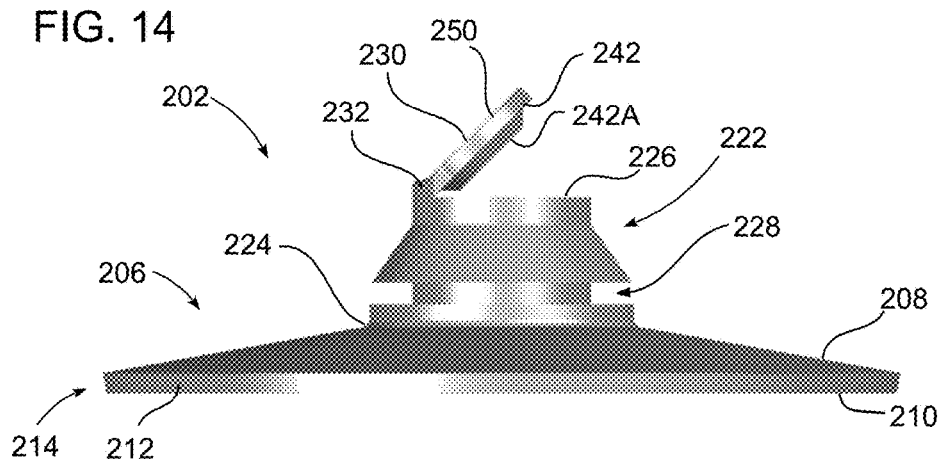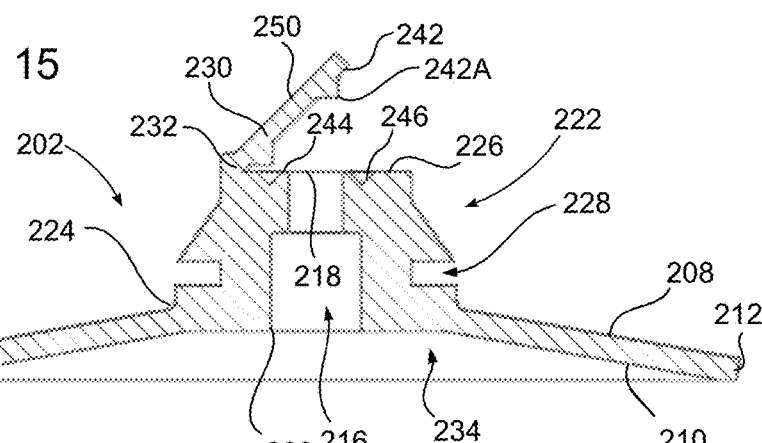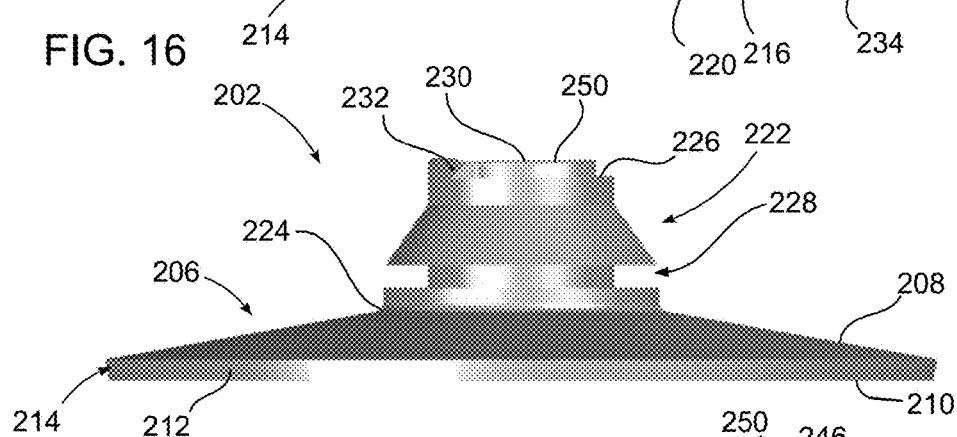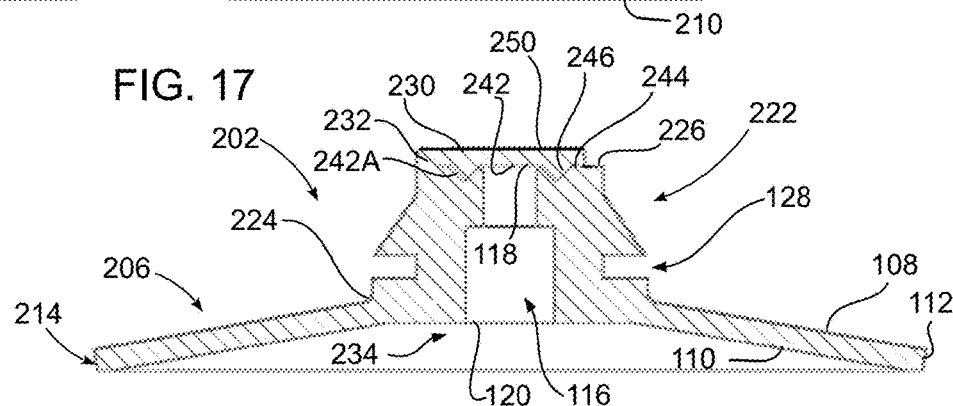

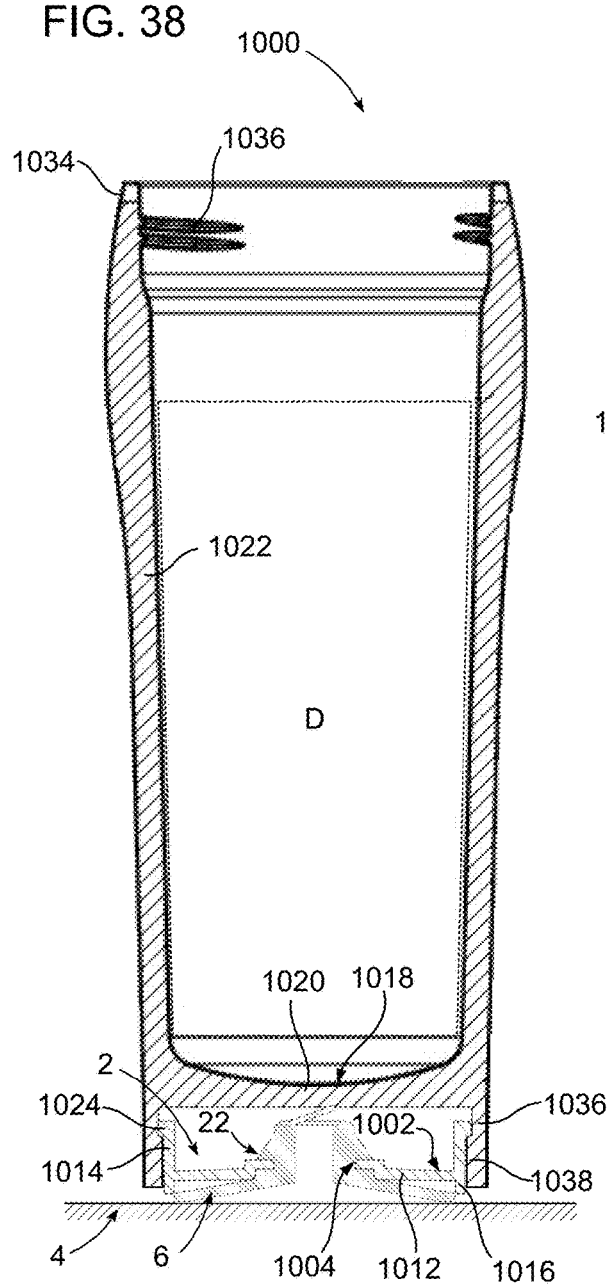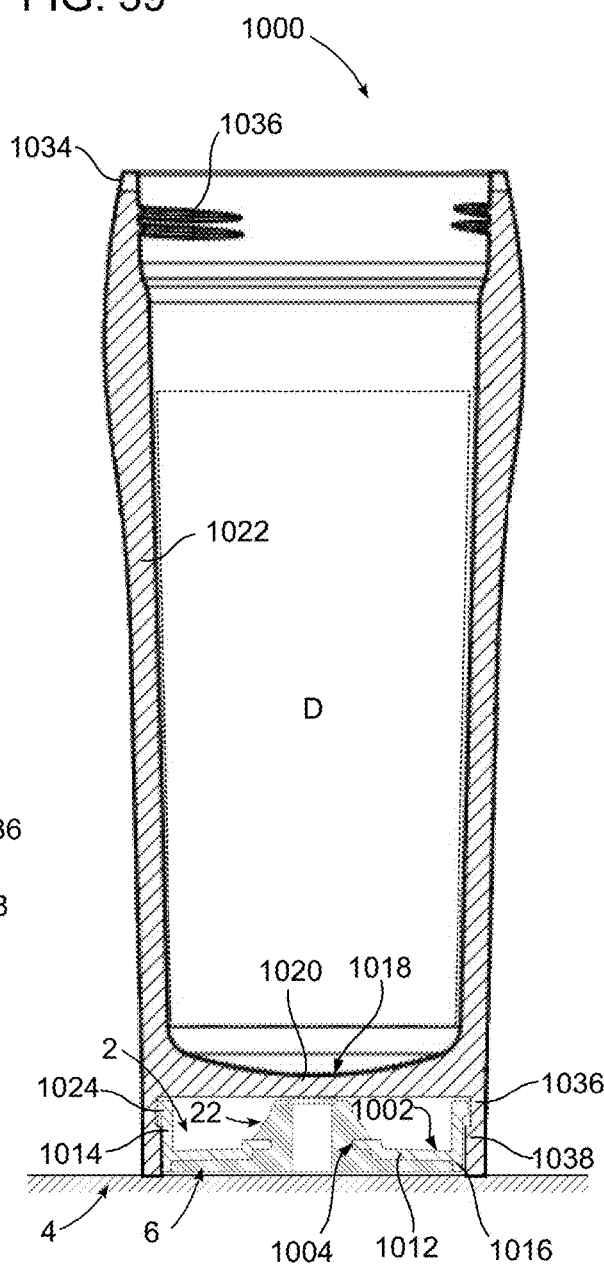

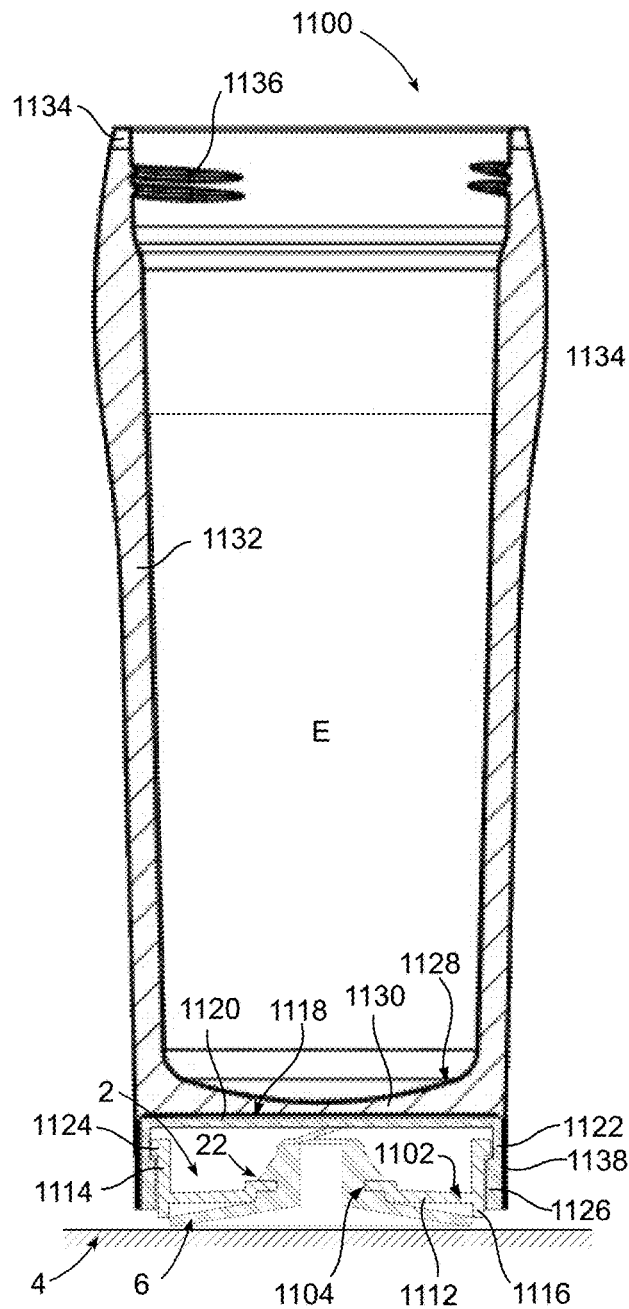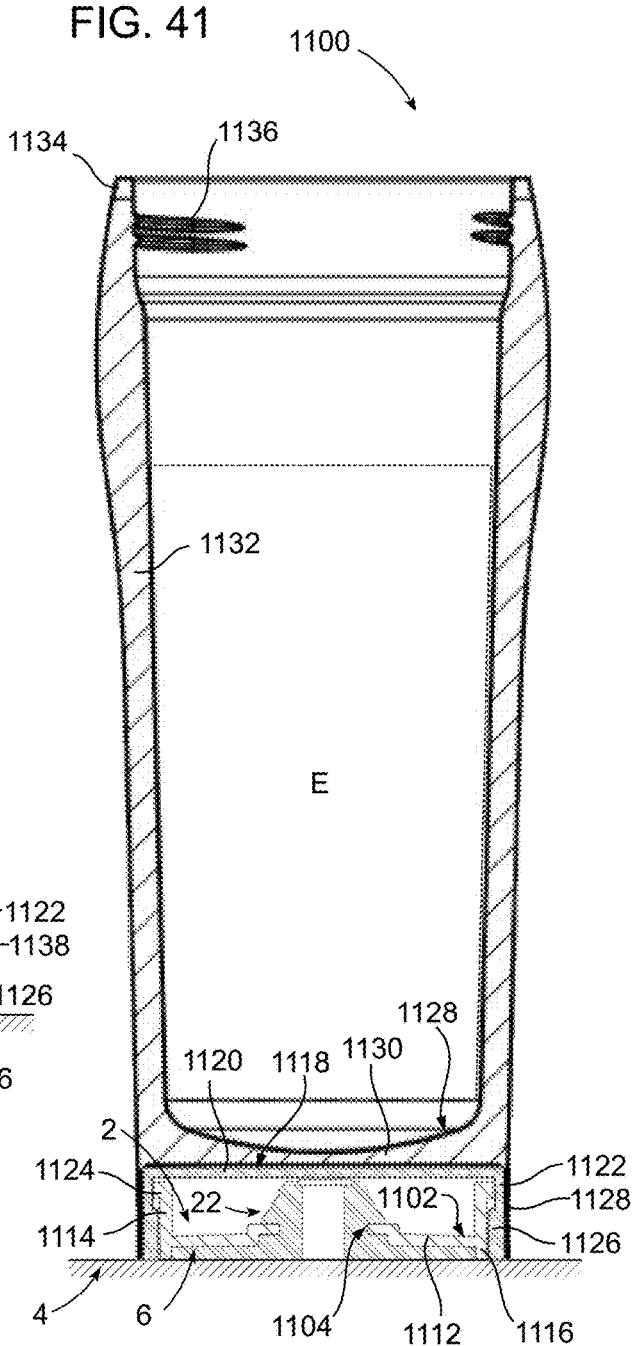

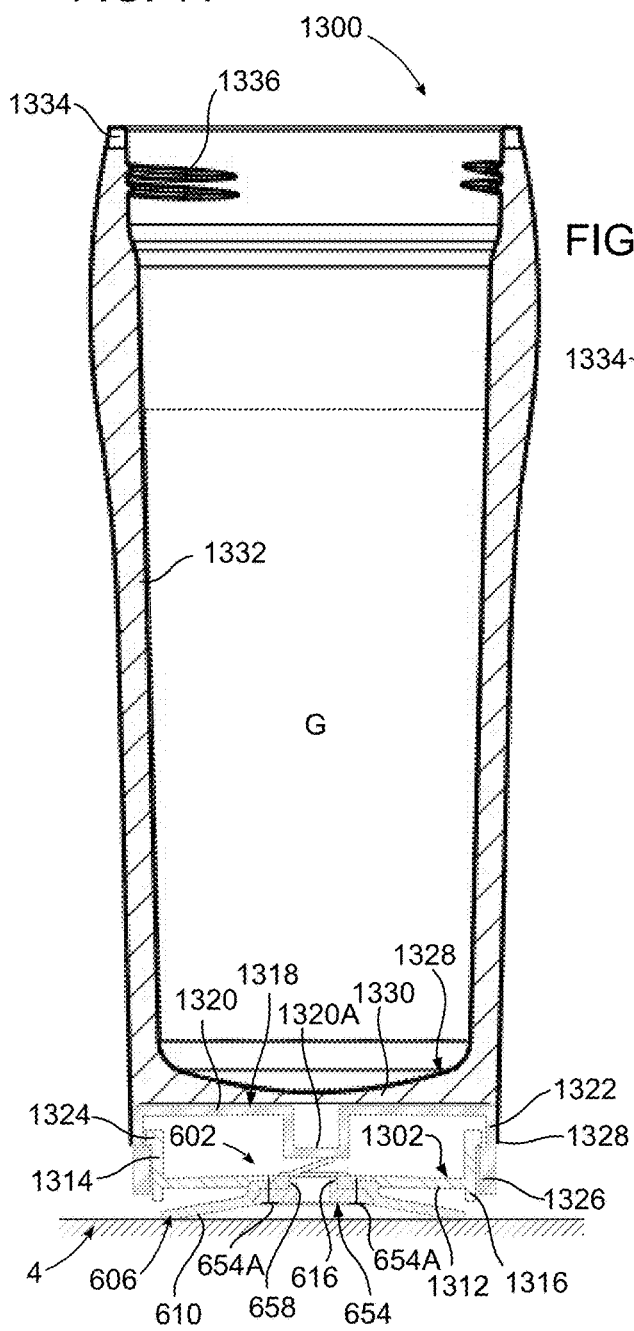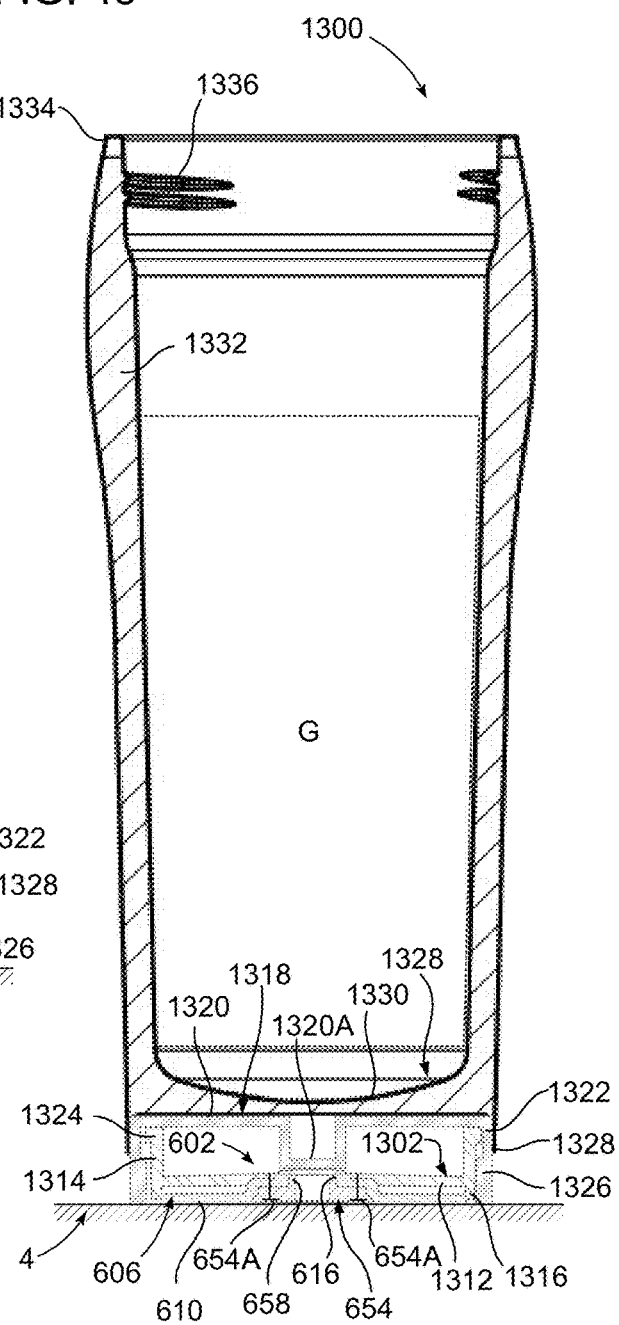

UNIVERSAL QUICK-RELEASE ANCHOR MEMBER

BACKGROUND

1. Field

The present disclosure relates to anchoring apparatus for releasably securing objects to surfaces. More particularly, the disclosure concerns anchoring apparatus with anchor members that adhere to surfaces by way of differential pressure when flexed. Still more particularly, the disclosure pertains to anchoring apparatus with quick-release differential pressure venting.

2. Description of the Prior Art

By way of background, anchoring apparatus that operate by way of differential pressure are known. Such apparatus often utilize anchor members such as suction cups and suction seal stabilizers. A suction cup typically includes a flexible base seal member configured as an elastomeric dome-shaped structure having a concave lower side and a relatively soft peripheral rim. In order to adhere the suction cup to a reference surface, the base seal member must be affirmatively flexed by pressing it against the reference surface with enough force to temporarily flatten the concave lower side so that air is expelled outside the peripheral rim. When the pressing force is released, the base seal member has a natural tendency to return to its initial dome shape. As this rebounding occurs, the volumetric cavity that lies inside the peripheral rim between the base seal member's lower side and the reference surface begins to enlarge. This in turn causes the air pressure in the volumetric cavity to proportionately decrease in accordance with Boyle's Law. A pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the base seal member to its initial concave configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the base seal member's peripheral rim and the reference surface.

Some suction cups are designed so that they can only be removed from the reference surface by applying sufficient brute lifting force to break the seal formed by the base seal member's peripheral rim, or by peeling up the rim to create a small opening that vents the volumetric cavity. Other suction cups are designed with a vent port and are used with anchoring apparatus having a mechanical stopper made of rigid material. The stopper is manually actuated into engagement with the vent port when it is desired to maintain suction, and is manually actuated out of engagement with the vent port when it is desired to break the suction. The stopper is typically hand-operable and cannot be actuated except by way of a specific movement pattern that involves the stopper being moved a noticeable distance.

A suction seal stabilizer includes a base seal member that operates somewhat similarly to a suction cup's base seal member, but is typically less concave, or even flat, and usually made from a softer more resilient material. Alternatively, the base seal member of a suction seal stabilizer may be constructed of the same material as a suction cup base seal member, but is thinner and more flexible than its suction cup counterpart. When a properly designed suction seal stabilizer is placed on a reference surface, no pushing force needs to be applied to flatten the base seal member apart from the weight of the stabilizer itself and any items or materials that it carries. Such devices are thus generally self-sealing (self-anchoring) in a manner that is not noticeable to the user. Because the base seal member is usually highly flexible and may have little or no concavity, its elastic rebound forces may be relatively weak and generally insufficient to overcome the opposing gravitational forces bearing down on the suction seal stabilizer. If the base seal member remains substantially flat against the reference surface with little or no rebound occurring, the suction forces will be negligible or non-existent. In some designs, the suction seal stabilizer may even be capable of being moved laterally over the reference surface with little apparent resistance. On the other hand, large suction forces will be generated when an attempt is made to pull the suction seal stabilizer away from the reference surface, or tilt the stabilizer, such as by applying a side load against an object being carried by the stabilizer. This property of suction seal stabilizers is advantageous for certain applications, such as when the stabilizer supports a beverage container. In that case, the beverage container can be moved laterally if a side load is applied sufficiently close to the reference surface, but will resist tipping and spillage when a side load or acceleration force is applied at higher elevations.

In a typical suction seal stabilizer, a vent port is provided for releasing the stabilizer from the reference surface. In such designs, an anchoring apparatus that incorporates the suction seal stabilizer may include a movable auxiliary component that acts as a mechanical stopper to open and close the vent port. The movable auxiliary component may be configured to carry an item or material that is to be anchored by the anchoring apparatus. Lifting the auxiliary component opens the vent port, allowing the anchoring apparatus to be lifted without appreciable resistance. This provides a form of stealth mode operation in which the user is not aware of the action of the suction seal stabilizer. When the anchoring apparatus is placed back down on the attachment surface, the movable auxiliary component will reengage the vent port, thereby "arming" the suction seal stabilizer into a stabilizing mode.

It is to improvements in the design of anchor members embodied as suction cups or suction seal stabilizers that the present disclosure is directed.

SUMMARY

A universal quick-release anchor member includes a flexible base seal member comprising a non-porous resilient material. The base seal member has a seal member upper side, a seal member lower side, and a seal member peripheral edge defining an outer periphery of the seal member upper side and the seal member lower side. The seal member lower side is configured to engage an external reference surface and form a substantially airtight seal therewith that defines a controlled pressure zone, the controlled pressure zone being located between the seal member lower side and the reference surface. A vent port extends through the anchor member, including the seal member upper side and the seal member lower side. The vent port includes a vent port upper end disposed on or above the seal member upper side and a vent port lower end disposed on the seal member lower side. An integral vent port closure member is disposed proximate to the vent port upper end. The vent port closure member is biased to move from a closed position to an open position. The closed position includes the vent port closure member being arranged to block the vent port upper end and prevent the passage of air through the vent port to thereby close the controlled pressure zone and render it airtight. The open position includes the vent port closure member being arranged to unblock the vent port upper end and allow the passage of air through the vent port to thereby vent the controlled pressure zone.

BRIEF DESCRIPTION OF THE DRAWINGS

The foregoing and other features and advantages will be apparent from the following more particular description of example embodiments, as illustrated in the accompanying Drawings.

FIG. 6 is a side elevation view showing the anchor member of FIG. 1 with an open vent port closure member.

FIG. 7 is a cross-sectional centerline view showing the anchor member of FIG. 1 with an open vent port closure member.

FIG. 8 is a side elevation view showing the anchor member of FIG. 1 with a closed vent port closure member.

FIG. 9 is a cross-sectional centerline view showing the anchor member of FIG. 1 with a closed vent port closure member.

FIG. 14 is a side elevation view showing an anchor member according to another embodiment, with an open vent port closure member.

FIG. 15 is a cross-sectional centerline view showing the anchor member of FIG. 14 with an open vent port closure member.

FIG. 16 is a side elevation view showing the anchor member of FIG. 14 with a closed vent port closure member.

FIG. 17 is a cross-sectional centerline view showing the anchor member of FIG. 14 with a closed vent port closure member.

FIG. 38 is a cross-sectional centerline view showing an anchoring apparatus according to another embodiment that incorporates the anchor member of FIG. 1, with the vent port closure member of the anchor member being open.

FIG. 39 is a cross-sectional centerline view showing the anchoring apparatus of FIG. 38, with the vent port closure member of the anchor member being closed.

FIG. 40 is a cross-sectional centerline view showing an anchoring apparatus according to another embodiment that incorporates the anchor member of FIG. 1, with the vent port closure member of the anchor member being open.

FIG. 41 is a cross-sectional centerline view showing the anchoring apparatus of FIG. 40, with the vent port closure member of the anchor member being closed.

FIG. 44 is a cross-sectional centerline view showing an anchoring apparatus according to another embodiment that incorporates the anchor member of FIG. 26, with the vent port closure member of the anchor member being open.

FIG. 45 is a cross-sectional centerline view showing the anchoring apparatus of FIG. 44, with the vent port closure member of the anchor member being closed.

DETAILED DESCRIPTION OF EXAMPLE EMBODIMENTS

Figure 1:
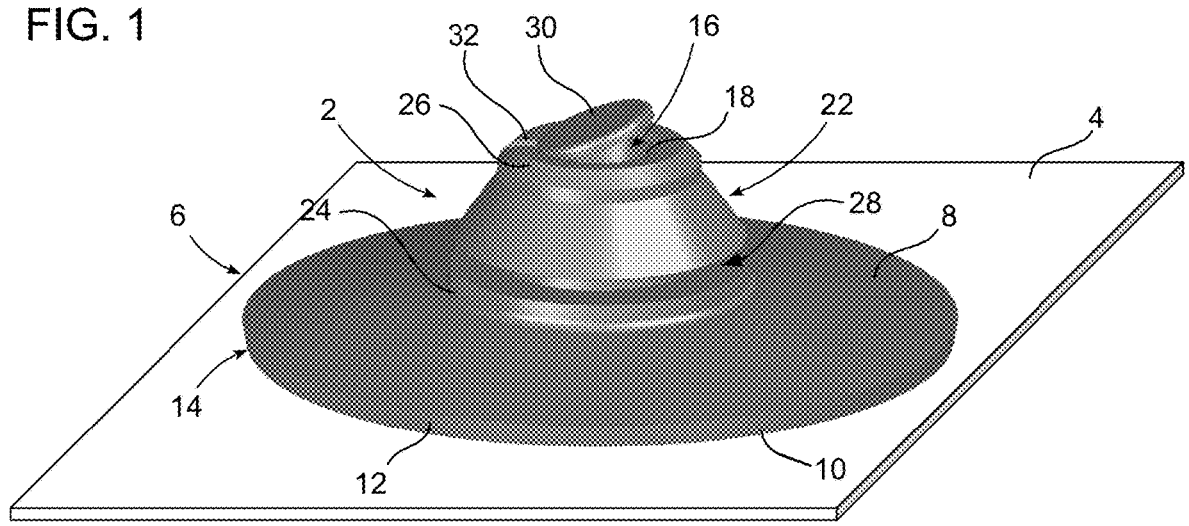
FIG. 1 is an upper perspective view showing an anchor member according to an example embodiment.

Turning now to the drawing figures, in which like reference numbers illustrate like structure in all of the several views, FIGS. 1-5 illustrate one possible embodiment of a universal quick-release anchor member 2 that may be constructed in accordance with the present disclosure. As described in more detail below, the anchor member 2 may be combined with one or more auxiliary components to provide on a quick-release anchoring apparatus having directional release and attachment capability. Various example anchoring apparatus are described below in connection with FIGS. 30-45. Such anchoring apparatus may be used to adhere many different types of articles (including but not limited to beverage-containing vessels) to a reference surface 4 (such as a table top) by establishing and maintaining a controlled pressure zone that generates a partial vacuum to resist tipping when a side load (and/or vertical load) is applied to the anchoring apparatus. In each of the disclosed anchoring apparatus embodiments, the partial vacuum may be released (sometimes surreptitiously) and the anchoring apparatus lifted away from the reference surface 4 (sometimes without discernible resistance) when the anchoring apparatus (or an article carried thereby) is grasped and maneuvered in a manner consistent with normal lifting thereof. The anchor member 2 may also be used with anchoring apparatus that require an intentional gesture (other than normal lifting) in order to be released.

The anchor member 2 may be formed entirely as a unitary single-component article manufactured by way of injection-molding or any other suitable technique. The anchor member 2 could also be formed as an assembly of two or more sub-components. However, a unitary single-component design may represent the most cost-effective approach. In its various embodiments, the anchor member 2 may include a flexible base seal member 6 that can be made from any suitable resilient material that is sufficiently non-porous, flexible and pliant during normal use to form an effective seal with the reference surface 4. Silicone rubber having a suitable hardness and density represents one such material. Other resilient materials may also be used. Although many different configurations are possible, the base seal member 6 may fundamentally include a seal member upper side 8, a seal member lower side 10, and a seal member peripheral edge 12 that defines an outer periphery 14 of the seal member upper side and the seal member lower side. As additionally shown in FIGS. 4-5, the outer periphery 14 of the base seal member 6 may be of substantially circular shape, with other shapes also being possible.

In some embodiments, the anchor member 2 may be constructed as a suction cup in which the base seal member 6 is sufficiently stiff and concave on its lower surface 10 to require that the anchor member be actively pushed against the reference surface 4 to flatten the base seal member and develop a sealed controlled pressure zone. In such cases, releasing the anchor member 2 will cause the base seal member 6 to experience a partial elastic rebound that generates a negative pressure differential in the controlled pressure zone (relative to ambient pressure outside the controlled pressure zone), thereby adhering the anchor member to the reference surface 4 with an initial suction force. In other embodiments, the anchor member 2 may take the form of a suction seal stabilizer in which the base seal member 6 is sufficiently pliable and non-concave on its lower surface 10 so as not to require that the anchor member be actively pushed against the reference surface 4 to flatten the base seal member. In such cases, the anchoring apparatus may be self-sealing (self-anchoring) in a manner that is not noticeable to a user. Moreover, the base seal member 6 may not experience sufficient elastic rebound to generate any noticeable negative pressure differential after being placed on the reference surface 4. Lifting the anchoring apparatus 2 can in many cases performed without any apparent resistance being offered by the seal member 11, thus facilitating stealth mode operation. Additional differences between the two types of anchor member (i.e., suction cups and suction seal stabilizers) are discussed in the Background section above.

A vent port 16 may extend centrally through the anchor member 2, including through the seal member upper side 8 and the seal member lower side 10. The vent port 16, which may be circular or of any other suitable cross-sectional shape, includes a vent port upper end 18 (FIGS. 1-4) disposed on or above the seal member upper side 8. A vent port lower end 20 (FIGS. 3 and 5) is disposed on the seal member lower side 10. In the illustrated embodiment of FIGS. 1-5, the vent port upper end 18 is located above the base seal member 6, namely, at the top of an anchor member stem 22 that may be integrally formed on the seal member upper side 8 in order to facilitate rigid self-mounting of the anchor member 2 to an auxiliary component to provide an anchoring apparatus (as briefly described above). In other embodiments, the anchor member stem 22 may be absent. In that case, the vent port upper end 18 may terminate on the seal member upper side 8. In such embodiments, an alternative mounting technique may be used to mount the anchor member 2 to an auxiliary component, including but not limited to mechanical fastening and/or adhesive bonding.

If present, the anchor member stem 22 may include a stem lower end 24 (FIGS. 1-2) disposed on the seal member upper side 8, and a raised stem upper end 26 (FIGS. 1-4) disposed some distance above the stem lower end. In the illustrated embodiment, the vent port 16 extends concentrically through the anchor member stem 22, along a central vertical axis thereof. In this configuration, the vent port upper end 18 will be disposed on the stem upper end 26. In the illustrated embodiment of FIGS. 1-5, the vent port 16 is configured as a straight vertically-oriented cylindrical bore of constant diameter that extends from the vent port upper end 18 to the vent port lower end 20. In other embodiments (described in more detail below), the vent port 16 may not have a constant diameter.

In the illustrated embodiment of FIGS. 1-5, the anchor member stem 22 is relatively rigid (with respect to the base seal member 6) and non-movable (both laterally and rotationally) due to the fact that its height-to-width ratio is low and the stem width is relatively high as compared to the vent port diameter. For example, the height of the anchor member stem 22 as measured between its lower end 24 and its upper end 26 may be approximately the same as its lower end diameter, thereby providing a stem-height-to-width ratio of 1:1. In the illustrated embodiment, the lower end 24 of the anchor member stem 22 represents the maximum diameter of the stem. Various other stem-height-to-width ratios could also be used, depending the material used for the anchor member 2 and the desired rigidity of the anchor member stem 22. The width of the anchor member stem 22 as measured at its smallest diameter section may be at least twice the width of the vent port 16 as measured at its largest diameter section, thereby providing a stem-to-vent-port-width ratio of at least 2:1. In the illustrated embodiment, the upper end 26 of the anchor member stem 22 represents the minimum diameter of the stem. Various other stem-to-vent-port-width ratios could also be used, again depending on the material used for the anchor member 6 and the desired rigidity of the anchor member stem 26. As described in more detail below, forming the anchor member stem 22 so as to be relatively rigid with respect to the base seal member 6 establishes a stable position for the vent port upper end 26. As described in more detail below, this stable position assists in closing the vent port 16 when placing the anchor member 2 on the reference surface 4. Side loads applied to an anchoring apparatus that incorporates the anchor member 2 will also be more efficiently transferred to the base seal member 6 with a relatively rigid anchor member stem 22, allowing the anchor member 2 to react quickly to initiate or increase its grip the reference surface 4 when the anchoring apparatus is so loaded.

The relative rigidity of the anchor member stem 22 extends not only from the stem upper end 26 to the stem lower end 24, but also through the underlying portion of the base seal member 6 that extends below the vent port lower end 20 to the seal member lower side 10. The anchor member stem 22 is thus well supported and dimensionally stable in the vertical direction, which also assists in closing the vent port 16 when placing the anchor member 2 on the reference surface 4. The relative rigidity of the anchor member stem 22 extending down to the seal member lower side 10 in the vicinity of the vent port lower end 20 is in contrast to the relatively thin and flexible configuration of the remaining major peripheral portion of the base seal member 6 extending outwardly from the lower end region of the anchor member stem to the peripheral edge 14.

Figure 2:
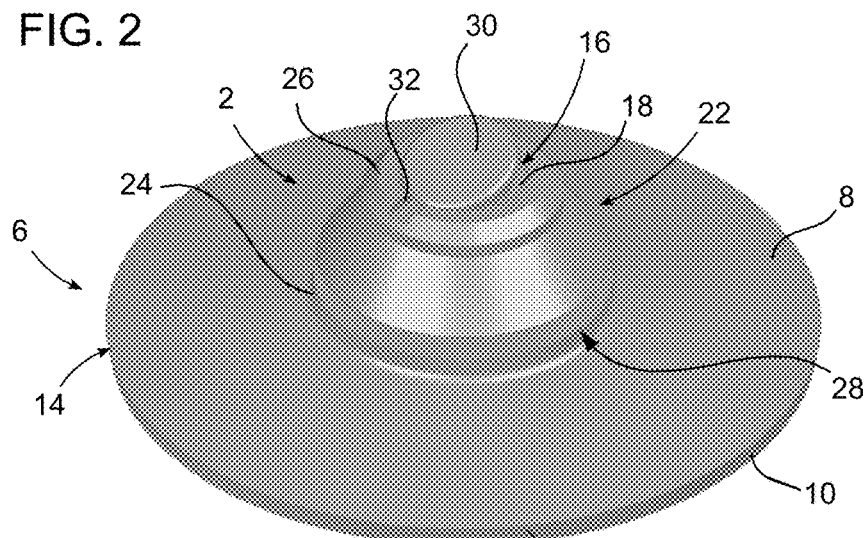
FIG. 2 is a further upper perspective view showing the anchor member of FIG. 1.
Figure 3:
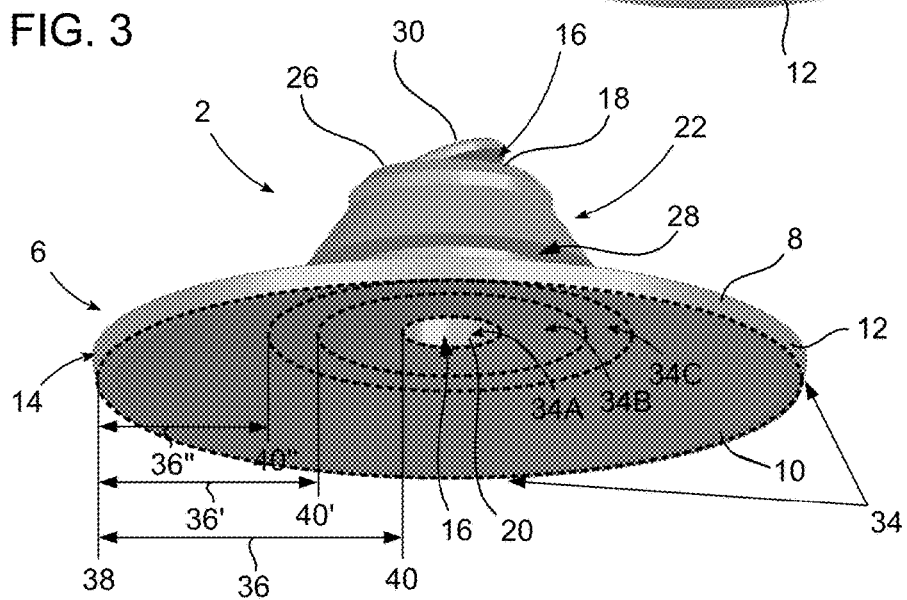
FIG. 3 is a lower perspective view showing the anchor member of FIG. 1.

As noted above, the maximum diameter of the anchor member stem 22 is at its lower end 24. In a medial section of the anchor member stem 22 that begins above the lower end 24, the anchor member stem may taper to a smaller diameter section that continues above the medial section to the stem upper end 26. As can be seen in FIGS. 1-3, this upwardly tapering portion of the anchor member stem 22 may form a frustocone that defines the medial section.

The anchor member stem 22 may include a stem mounting portion configured as an annular groove (channel) 28 for mounting the anchor member 2 to an auxiliary component. The annular groove 28 may be disposed at any convenient location between the stem lower end 24 and the stem upper end 26. In the illustrated embodiment of FIGS. 1-5, the annular groove 28 is configured to be received in a circular anchor member mounting bore of an auxiliary component of an anchoring apparatus that incorporates the auxiliary component. As described in more detail below, examples of anchor member mounting bores that engage the stem mounting portion 28 of the anchor member 6 are shown by reference number 704 of FIGS. 30-31, reference number 804 of FIGS. 34-35, reference number 904 of FIGS. 38-39, reference number 1004 of FIGS. 40-41, reference number 1104 of FIGS. 42-43, and reference number 1204 of FIGS. 44-45. The upper and lower sidewalls of the annular groove 28 may respectively engage upper and lower ends of the anchor member mounting bore, together with upper and lower surfaces of the auxiliary component that extend a short distance laterally therefrom, while the back wall of the annular groove may engage the side portion of the anchor member mounting bore. The walls of the annular groove thus serve to provide one or more engagement projections that may be used to engage the bore or opening of the auxiliary component, together with the adjacent surfaces of the auxiliary component, and thereby attach the anchor member 2 to the anchoring apparatus. As previously noted, various examples of auxiliary components to which the anchor member 2 may be mounted to provide an anchoring apparatus are described in more detail below in connection with FIGS. 30-45. Advantageously, the frustocone shape of the anchor member stem 22 immediately above the annular groove 28 aids in mounting the auxiliary component of the anchoring apparatus to the anchor member 2 by compressibly deforming the anchor member stem as it advances through the auxiliary component's anchor member mounting bore until the annular groove seats in the bore.

As shown in FIGS. 1-3, an integral vent port closure member 30 may be disposed proximate to the vent port upper end 18. In embodiments that include the anchor member stem 22, the vent port closure member 30 may be located on the stem upper end 26. In other embodiments that do not include a stem, the vent port closure member 30 may be located on the seal member upper side 8. In either case, the vent port closure member 30 may be connected to the anchor member 2 in various ways, including by way of an integral living hinge 32. As additionally shown in FIG. 4, the vent port closure member 30 may have a generally circular configuration when viewed in plan view orientation, with other shapes also being possible.

Figure 4:
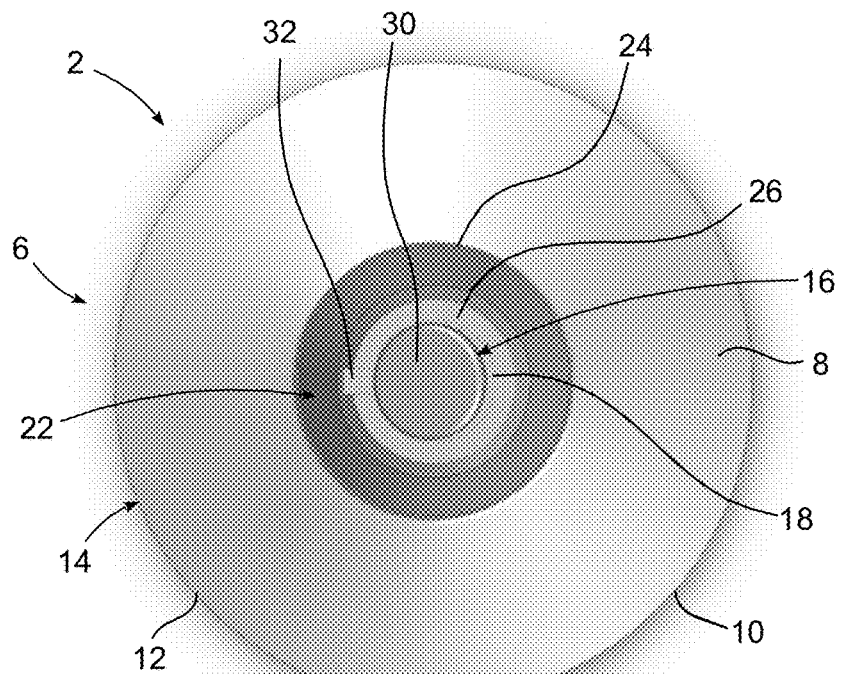
FIG. 4 is a top plan view showing the anchor member of FIG. 1.

As best shown in FIGS. 1, 2 and 4, the vent port closure member 30 is connected to the stem upper end 26 by way of the integral living hinge 32, and the stem 22 is connected to the base seal member 6 by way of an integral connection between the stem lower end 24 and the seal member upper side 8, all formed as a unitary article by way of an injection-molding operation or using any other suitable technique. In an alternate embodiment, the vent port closure member 30, the living hinge 32, the stem 22, and the base seal member 6 could be separately formed, then joined together using a suitable bonding technique, such as polymeric bonding, to make them integral with each other.

The living hinge 32 may be formed on one side of the vent port closure member 30, such that the vent port closure member operates as a flap wherein the side connected to the living hinge pivots and the opposite side lifts away from the vent port upper end 18. In other embodiments, such as an embodiment described below in connection with FIGS. 18-21, the vent port closure member 30 may be secured by two or more living hinges 32, such that the vent port closure member operates as a movable vent cap that raises and lowers without pivoting.

The vent port closure member 30 may be biased to move from a closed position to an open position. The open position comprises the vent port closure member 30 being arranged to unblock the vent port upper end 18 and allow the passage of air through the vent port 16 to thereby vent the controlled pressure zone. This position is illustrated in FIGS. 6 and 7. The closed position includes the vent port closure member 30 being arranged to block the vent port upper end 18 and prevent the passage of air through the vent port 16 to thereby seal a controlled pressure zone below the seal member lower side 10 and render it airtight. This position is illustrated in FIGS. 8 and 9.

As described in more detail below in connection with FIGS. 30-45, when the anchor member 2 is incorporated into an anchoring apparatus, one of the auxiliary components of the anchoring apparatus may be a movable member that operates to engage the vent port closure member 30 and force it closed against the inherent opening bias provided by the living hinge 32. This movable member may have a first position in which it closes the vent port closure member 30 against the vent port upper end 18 to facilitate anchoring of the anchoring apparatus on the reference surface 4, and a second position in which it releases the vent port closure member from the vent port upper end to facilitate release of the anchoring apparatus from the reference surface. In such an anchoring apparatus, the vent port closure member 30 provides more effective and reliable sealing of the controlled pressure zone when engaged by the movable member than if the movable member simply directly engaged the vent port upper end 18 itself. By incorporating the vent port closure member 30, the positioning of the movable member is not as critical, and may vary to a larger degree of tolerance than if the movable member was required to directly engage the vent port upper end 16. Moreover, sealing of the controlled pressure zone is less likely to be lost due to small shifts in position of the movable member.

The configuration of the base seal member 6 is such that when the seal member lower side 10 engages the reference surface 4 with the vent port 16 blocked by the vent port closure member 30, a substantially airtight seal is formed that seals the above-mentioned controlled pressure zone. In the illustrated embodiment of FIGS. 1-5, the controlled pressure zone represents a circular region of variable size located within the base seal member's outer periphery 14 and between the seal member lower side 10 and the reference surface 4. The general region where the controlled pressure zone is capable of developing is indicated by reference number 34 in FIGS. 3 and 5. It will be appreciated that the size and shape of the controlled pressure zone 34 may vary according to the construction of the base seal member 6 and the applied forces that produce deformations thereof during use of the anchor member 2, as will now be described.

When the base seal member 6 is in sealing contact with the reference surface 4, some portion of the lower side 10 thereof may lie flat on the reference surface in conforming interfacial contact therewith so as to form an airtight seal region 36. The airtight seal region 36 may be annular in shape, having a radial outer edge and a radial inner edge. The controlled pressure zone 34 will tend to lie within the interior of the annular airtight seal region 46, which establishes a controlled pressure zone periphery.

Figure 5:
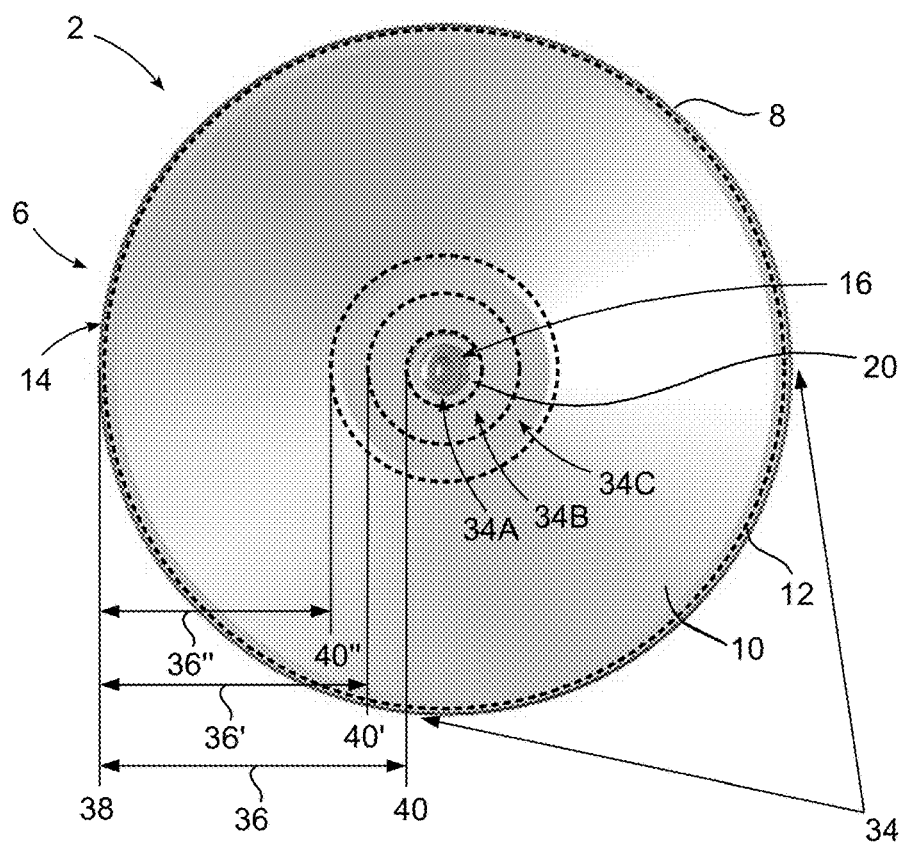
FIG. 5 is a lower plan view showing the anchor member of FIG. 1.
Figure 10:
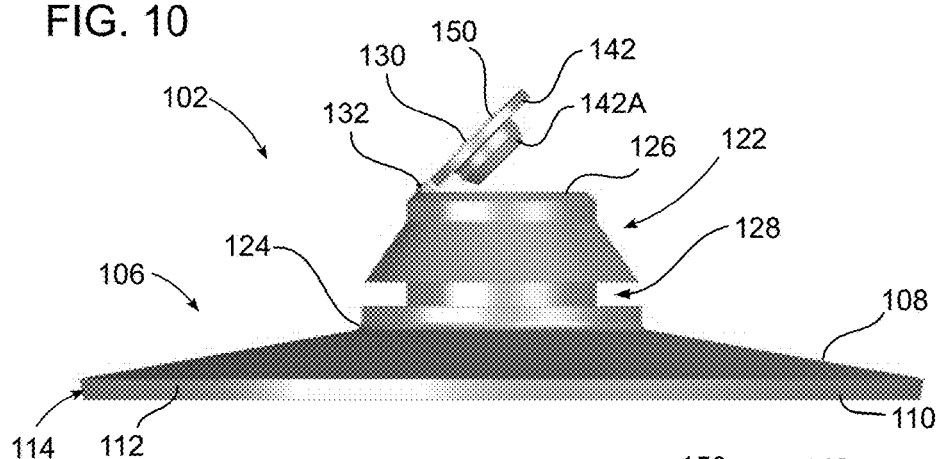
FIG. 10 is a side elevation view showing an anchor member according to another embodiment, with an open vent port closure member.
Figure 11:
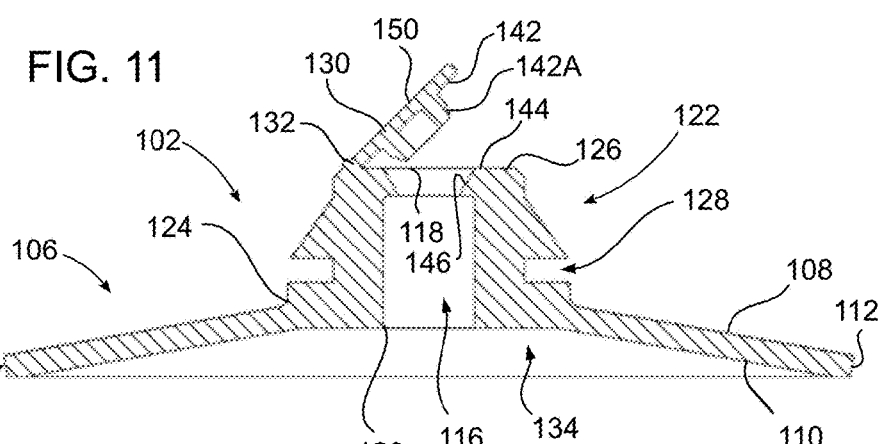
FIG. 11 is a cross-sectional centerline view showing the anchor member of FIG. 10 with an open vent port closure member.
Figure 12:
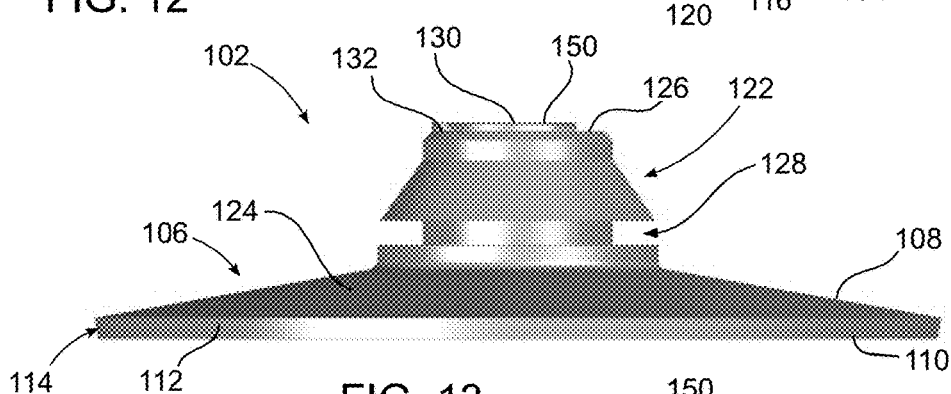
FIG. 12 is a side elevation view showing the anchor member of FIG. 10 with a closed vent port closure member.
Figure 13:
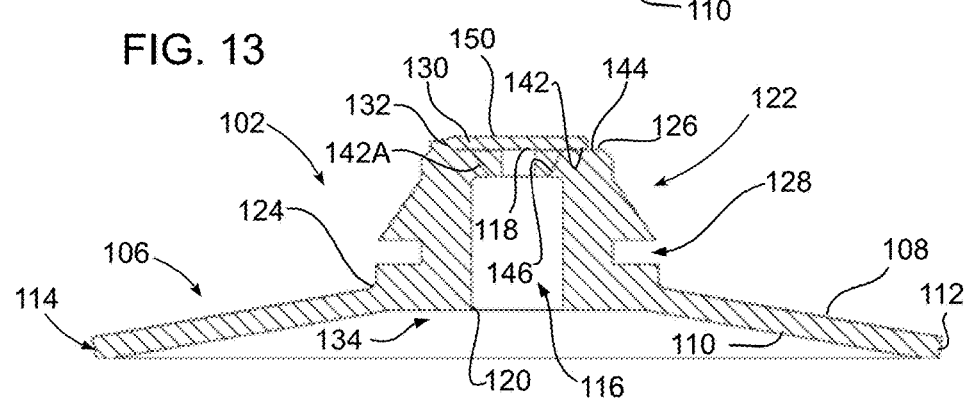
FIG. 13 is a cross-sectional centerline view showing the anchor member of FIG. 1 with a closed vent port closure member.
Figure 18:
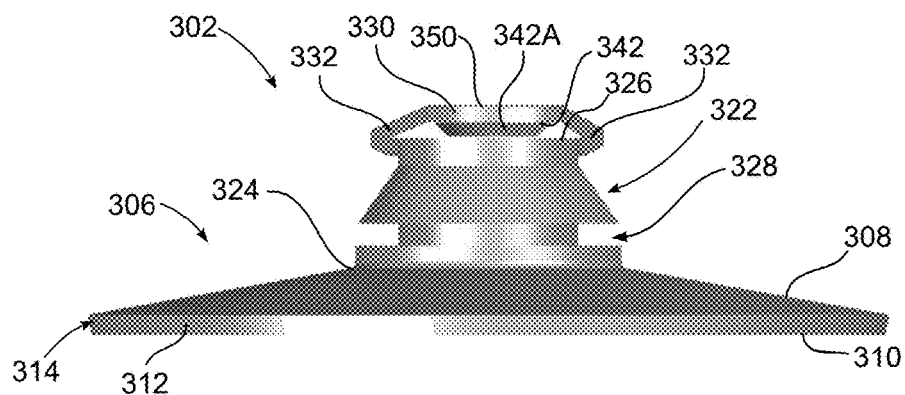
FIG. 18 is a side elevation view showing an anchor member according to another embodiment, with an open vent port closure member.
Figure 19:
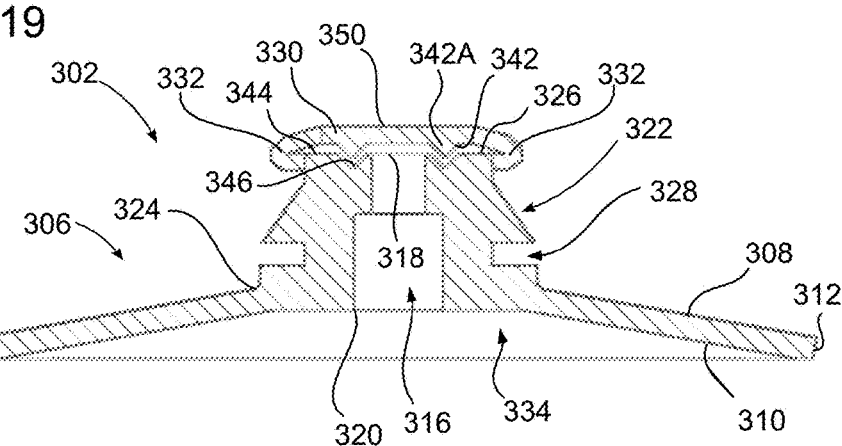
FIG. 19 is a cross-sectional centerline view showing the anchor member of FIG. 18 with an open vent port closure member.
Figure 20:
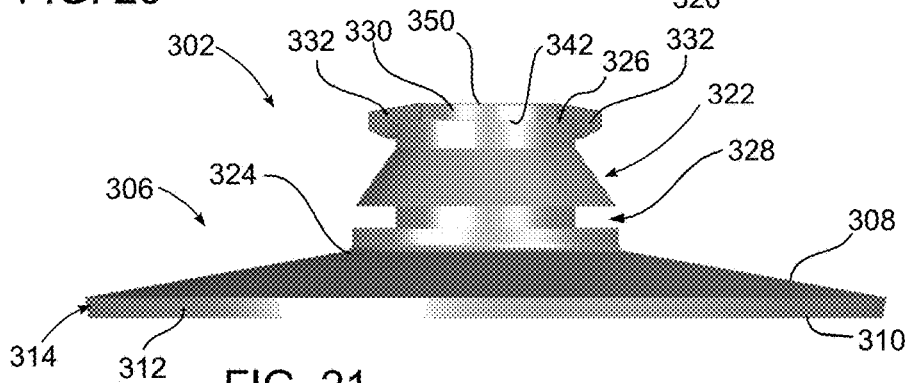
FIG. 20 is a side elevation view showing the anchor member of FIG. 18 with a closed vent port closure member.
Figure 21:
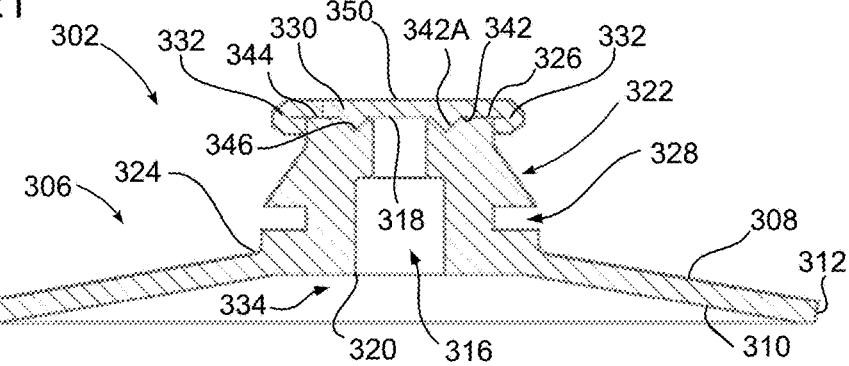
FIG. 21 is a cross-sectional centerline view showing the anchor member of FIG. 18 with a closed vent port closure member.

In FIGS. 3 and 5, example locations of the airtight seal region's inner and outer edges are shown using dashed-line representations. In the base seal member's state of sealing contact with the reference surface 4, the outer edge of the airtight seal region 36 may lie at or near the base seal member's outer periphery 14, as indicated by reference number 38 in FIGS. 3 and 5. This position will typically not change as a result of subsequent deformations of the base seal member 6 so long as the anchor member 2 remains adhered to the reference surface 4. The inner edge of the airtight seal region 36 will lie radially inwardly from the seal member's outer periphery 14, somewhere between the outer edge location 38 and the vent port 16.

In some configurations of the base seal member 6, the seal member lower side 10 may be completely flat in the base seal member's state of sealing contact with the reference surface 4. In that case, the airtight seal region 36 may extend all the way from its outer edge 38 to the vent port 16. Reference number 40 in FIGS. 3 and 5 indicates an example placement of the airtight seal region's inner edge at this location. When the airtight seal region inner edge 40 is thus situated, the controlled pressure zone 34 will have a negligible volume that may be defined solely by the area of the vent port 16, as shown by reference number 34A in FIGS. 3 and 5.

In other configurations of the base seal member 6, the seal member lower side 10 may not be completely flat in the base seal member's state of sealing contact with the reference surface. For example, an inner circular area of the seal member lower side 10 that is centered on the vent port 16 may be raised above the reference surface 4. In that case, the airtight seal region 36 may extend only part of the way from its outer edge 38 to the vent port 16, with the inner edge of the airtight seal region 36 being situated at the perimeter of the inner circular area where the seal member lower side 10 begins to rise above the reference surface 4. Reference number 40' in FIGS. 3 and 5 indicates an example placement of the airtight seal region's inner edge at such an intermediate location. When the airtight seal region inner edge 40' is thus situated, the controlled pressure zone 34 may have a non-negligible volume that extends beyond the area of the vent port 16 to the perimeter of the raised inner circular area, as shown by reference number 34B in FIGS. 3 and 5.

At some point while the base seal member 6 is in sealing contact with the reference surface 4, the anchor member 2 may be acted upon by outside forces that tend to separate the base seal member from the reference surface. Such forces include lifting forces directed away from the reference surface 4, tilting forces directed laterally at some distance above the reference surface, or combinations of such forces. When outside forces of this type are applied, the natural flexibility of the base seal member 6 will allow it to deform. Such deformations may be characterized by a radial inner portion of the airtight seal region 36 tending to separate from the reference surface 4, causing the inner edge 40 of the airtight seal region to dynamically reposition radially outwardly toward the outer edge 38. Reference number 40" in FIGS. 3 and 5 represents one example dynamic repositioning of the inner edge 40 that produces an airtight seal region 36" of reduced size. Such repositioning of the airtight seal region's inner edge 40" correspondingly produces an enlarging void at the center of the seal member lower side 10 and thereby expands the volume of the controlled pressure zone 34. Reference number 34C in FIGS. 3 and 5 illustrates such an expanded controlled pressure zone. The air pressure within the expanded controlled pressure zone 34C, which is sealed in an airtight manner, will consequently decrease in accordance with Boyle's law, thereby causing the anchor member 2 to experience increased adherence to the reference surface 4.

As previously noted, the foregoing base seal member deformation scenario only occurs when the vent port 16 is closed by the vent port closure member 30, as shown in FIGS. 8 and 9. When the vent port closure member 30 is open, as shown in FIGS. 6 and 7, the controlled pressure zone 34 will be vented to an area of ambient pressure outside the anchor member 2, which may be atmospheric pressure.

In order to adequately seal the controlled pressure zone 34, the vent port closure member 30 should form an airtight seal with the structure on which it seats in the seal member closure position. If the vent port closure member 30 seats against the upper end 26 of the anchor member stem 22, as in the illustrated embodiment of FIGS. 1-5, the vent port closure member may be formed as a valve and the stem upper end may be formed as a valve seat. In embodiments that do not include the anchor member stem 22, the vent port closure member 30 may likewise be formed as a valve, but the valve seat may be formed on the seal member upper side 8 where the vent port closure member may be mounted.

With additional reference now to FIGS. 6-9, an example valve-and-seat configuration is shown wherein the vent port closure member 30 comprises a substantially planar lower surface 42 configured for mating engagement with a substantially planar landing zone 44 of the stem upper end 26. As best shown in FIG. 7, the landing zone 44 may be situated at the bottom of an annular recess 46 formed in the stem upper end 26. The landing zone 44 provides a flat annular region that concentrically surrounds the vent port 16 proximate to the vent port upper end 18. This flat annular region receives the radial outer portion of the vent port closure member's planar lower surface 42, and makes secure interfacial contact therewith in order to block the vent port 16 and seal the controlled pressure zone 34. It will be appreciated that the landing zone 44 need not necessarily be recessed. For example, the annular recess 46 could be dispensed with and the landing zone 44 could instead be formed on an annular flat portion of the stem upper end 26 itself. However, as shown in FIG. 9, one advantage of recessing the landing zone 44 within the annular recess 46 is to provide an enhanced seal by allowing the sidewall of the vent port closure member 30 to engage the sidewall of the annular recess, as shown by reference number 48.

In the illustrated embodiment of FIGS. 1-9, the vent port closure member 30 may be formed with a substantially planar upper surface 50. This configuration allows the vent port closure member 30 to be engaged by any flat-surfaced (or non-flat-surfaced) movable auxiliary component in an anchoring apparatus that incorporates the anchor member 2 (e.g., as per FIGS. 30-45 discussed below). Non-planar upper surface configurations could also be used for the vent port closure member 30.

Turning now to FIGS. 10-13, an alternative anchor member 102 is shown that is substantially the same as the anchor member 2 of FIGS. 1-9, but uses a modified vent port closure member design. Correspondence between components of the embodiment of FIGS. 10-13 and like components of the embodiment of FIGS. 1-9 is indicated by using the same reference numbers incremented by 100.

The difference between the vent port closure designs of FIGS. 1-9 and FIGS. 10-13 pertains to the manner in which the vent port closure member seats on the stem upper end. In FIGS. 10-18, the lower surface 142 of the vent port closure member 130 is configured with a tapered plug 142A. Correspondingly, the stem upper end 126 is formed with a landing zone 144 that includes a tapered recess 146 whose taper matches the taper of the vent port closure member's lower surface 142.

Turning now to FIGS. 14-17, a further alternative anchor member 202 is shown that is substantially the same as the anchor member 2 of FIGS. 1-9, but uses another modified vent port closure member design. Correspondence between components of the embodiment of FIGS. 14-17 and like components of the embodiment of FIGS. 1-9 is indicated by using the same reference numbers incremented by 200.

The difference between the vent port closure designs of FIGS. 1-9 and FIGS. 14-17 pertains to the manner in which the vent port closure member seats on the stem upper end. In FIGS. 14-17, the lower surface 242 of the vent port closure member 230 is configured with a protruding ring 242A of circular (or other) shape having a triangular (or other) cross-sectional configuration. Correspondingly, the stem upper end 226 is formed with a landing zone 244 that includes a ring-shaped recess 246 whose shape and size matches the ring 242A formed on the vent port closure member's lower surface 242.

Turning now to FIGS. 18-21, a further alternative anchor member 302 is shown that is substantially the same as the anchor member 2 of FIGS. 1-9, but uses another modified vent port closure member design. Correspondence between components of the embodiment of FIGS. 18-21 and like components of the embodiment of FIGS. 1-9 is indicated by using the same reference numbers incremented by 300.

The difference between the vent port closure designs of FIGS. 1-9 and FIGS. 18-21 pertains to the manner in which the vent port closure member is attached to the stem upper end, and also to manner in which the vent port closure member seats on the stem upper end. In FIGS. 18-21, the vent port closure member 30 is connected to the stem upper end 326 by multiple (2 or more) living hinges 332, and operates as a movable vent cap that raises and lowers without pivoting. The lower surface 342 of the vent port closure member 330 is configured with a protruding ring 342A of circular (or other) shape having a triangular (or other) cross-sectional configuration. Correspondingly, the stem upper end 326 is formed with a landing zone 344 provided by a ring-shaped recess 346 whose shape and size matches ring formed on the vent port closure member's lower surface 342.

Figure 22:
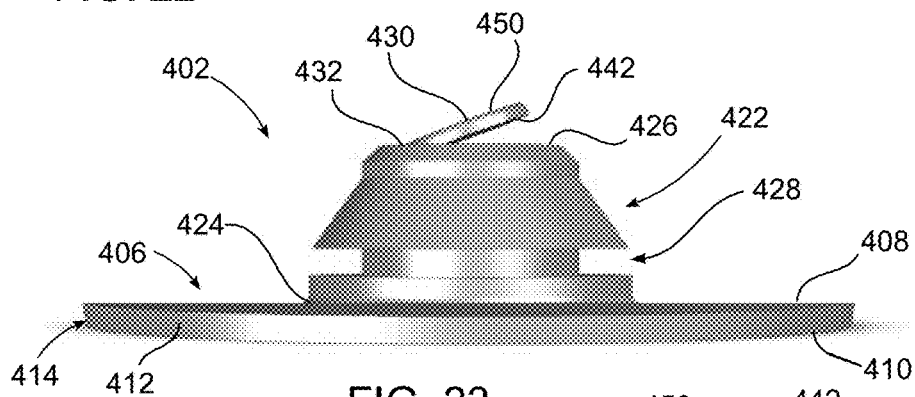
FIG. 22 is a side elevation view showing an anchor member according to another embodiment, with an open vent port closure member.
Figure 23:
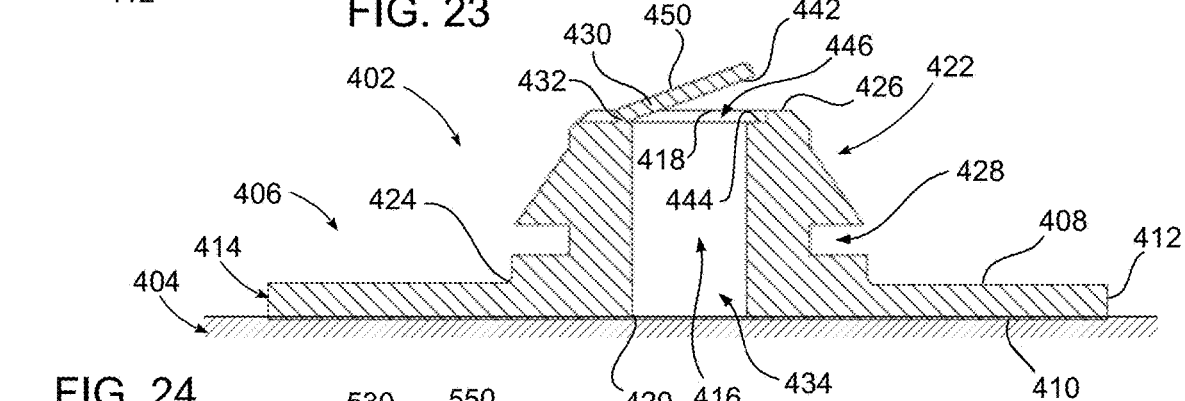
FIG. 23 is a cross-sectional centerline view showing the anchor member of FIG. 22 with an open vent port closure member.

Turning now to FIGS. 22-23, an anchor member 402 is constructed in accordance with a further alternative embodiment of the present disclosure. Correspondence between components of the embodiment of FIGS. 22-23 and like components of the embodiment of FIGS. 1-9 is indicated by using corresponding reference numbers incremented by 400. Whereas the anchor member 2 of FIGS. 1-9 may have a base seal member 6 constructed as either a suction cup or a suction seal stabilizer, the anchor member 402 of FIGS. 22-23 has a base seal member 406 that functions as a suction seal stabilizer. This is due to the base seal member 406 being sufficiently pliable and non-concave on its lower surface 410 so as not to require that the anchor member 402 be actively pushed against the reference surface 404 to flatten the base seal member. When the anchor member 402 is placed on the reference surface 404 with the vent port closure member 430 closing the vent port 416, no negative pressure differential will develop beneath the seal member lower side 410 in the controlled pressure zone 434 until an attempt is made to deform the base seal member 406. This characteristic provides an opportunity for the anchor member 402 to be moved laterally over the reference surface 404 without any suction force being felt by the user, so long as no deformation of the base seal member 406 occurs during the translation.

Figure 24:
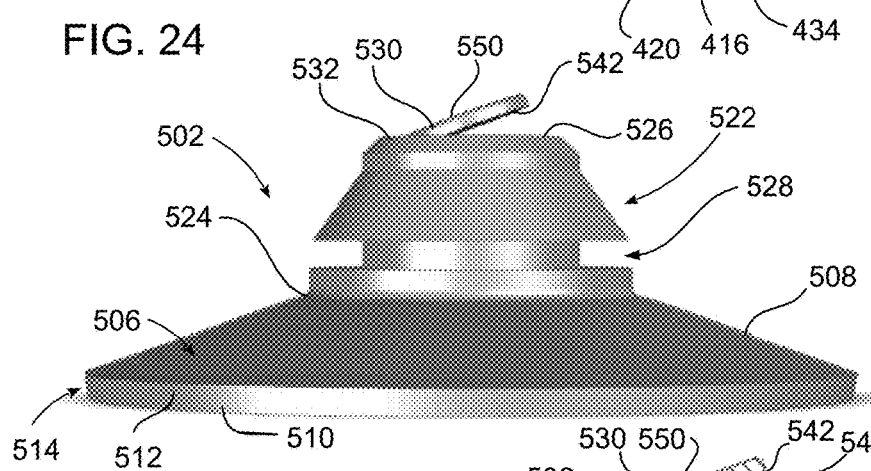
FIG. 24 is a side elevation view showing an anchor member according to another embodiment, with an open vent port closure member.
Figure 25:
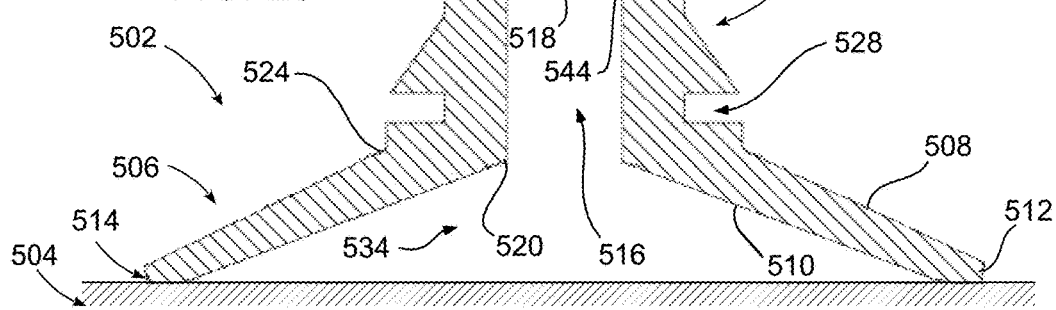
FIG. 25 is a cross-sectional centerline view showing the anchor member of FIG. 24 with an open vent port closure member.
Figure 26:
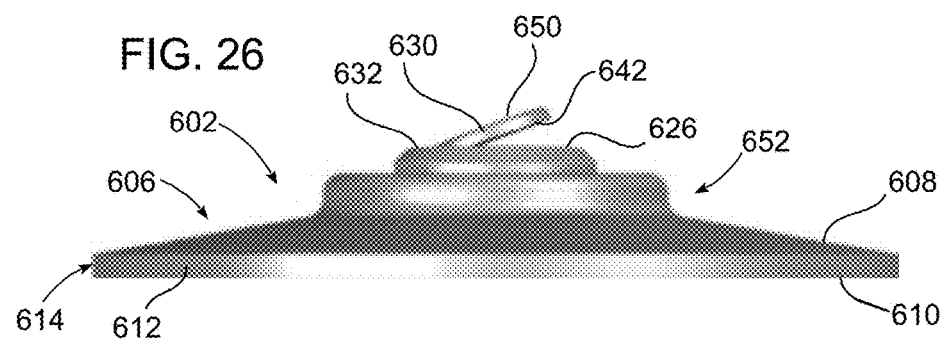
FIG. 26 is a side elevation view showing an anchor member according to another embodiment, with an open vent port closure member.

Turning now to FIGS. 24-25, an anchor member 502 is constructed in accordance with a further alternative embodiment of the present disclosure. Correspondence between components of the embodiment of FIGS. 24-25 and like components of the embodiment of FIGS. 1-9 is indicated by using corresponding reference numbers incremented by 500. Whereas the anchor member 2 of FIGS. 1-9 may have a base seal member 6 constructed as either a suction cup or a suction seal stabilizer, the anchor member 502 of FIGS. 22-23 has a base seal member 506 that functions as a suction cup. This is due to the base seal member 506 being sufficiently stiff and concave on its lower surface 510 to require that the anchor member 502 be actively pushed against the reference surface 504 to flatten the base seal member. When the anchor member 502 is pushed so that its base seal member 506 is flattened against the reference surface 504 with the vent port closure member 530 closing the vent port 516, and then released, the resultant deformation of the base seal member 506 will cause a negative pressure differential to develop under the seal member lower side 510 in the controlled pressure zone 534. This will cause the anchor member 502 to adhere to the reference surface 504.

Turning now to FIGS. 26-29, an anchor member 602 is constructed in accordance with a further alternative embodiment of the present disclosure, but eliminates the anchor member stem 22. Correspondence between components of the embodiment of FIGS. 26-29 and like components of the embodiment of FIGS. 1-9 is indicated by using corresponding reference numbers incremented by 600.

Figure 27:
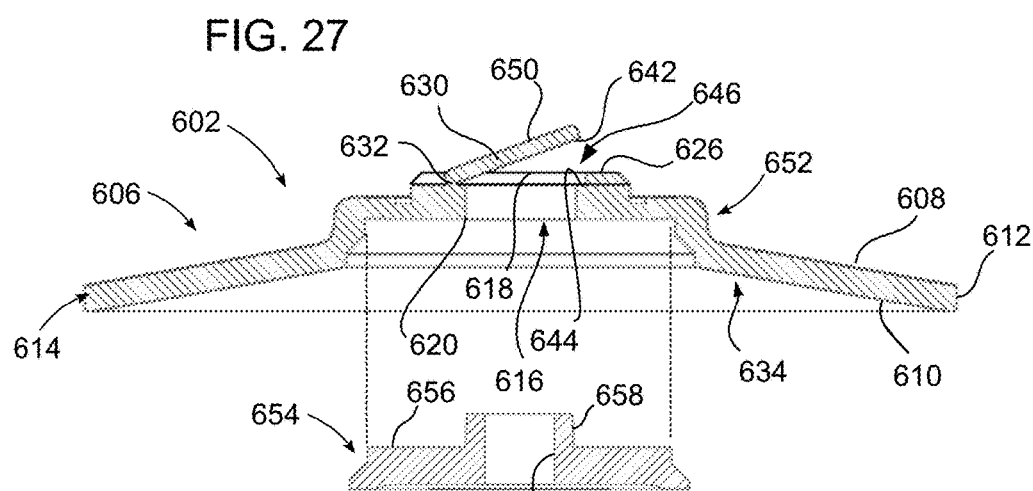
FIG. 27 is a cross-sectional centerline view showing the anchor member of FIG. 26 with an open vent port closure member.
Figure 28:
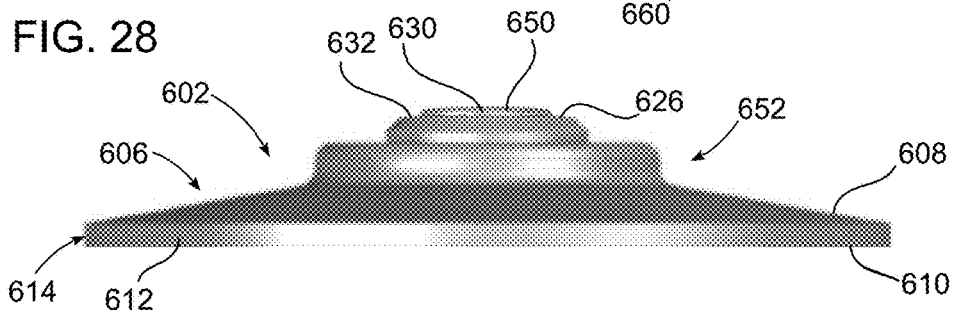
FIG. 28 is a side elevation view showing the anchor member of FIG. 26 with a closed vent port closure member.
Figure 29:
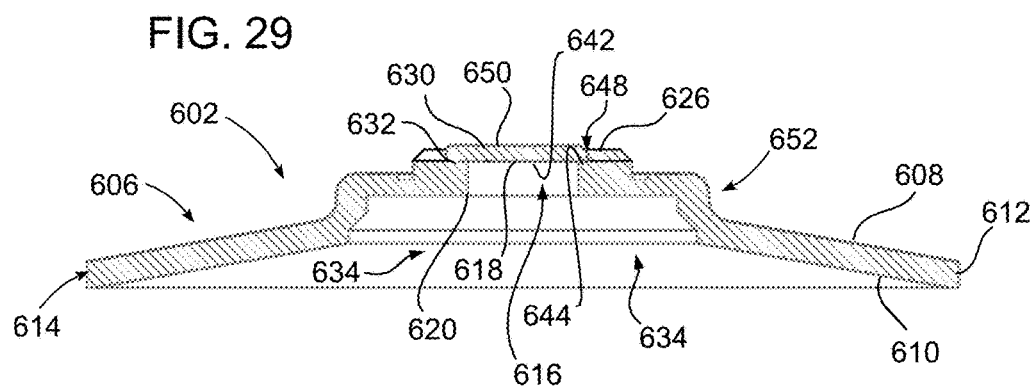
FIG. 29 is a cross-sectional centerline view showing the anchor member of FIG. 26 with a closed vent port closure member.

With the elimination of the anchor member stem 22, the upper end 618 of the vent port 616 is disposed on the seal member upper side 608. The vent port closure member 630 is likewise disposed at this location. An example valve-and-seat configuration is shown wherein the vent port closure member 630 comprises a substantially planar lower surface 642 configured for mating engagement with a substantially planar landing zone 644 of the seal member upper side 608. As best shown in FIG. 27, the landing zone 644 may be situated at the bottom of an annular recess 646 formed in the seal member upper side 608. As in the case of the anchor member 2 shown in FIGS. 1-9, the landing zone 644 provides a flat annular region that concentrically surrounds the vent port 616 proximate to the vent port upper end 618. This flat annular region receives the radial outer portion of the vent port closure member's planar lower surface 642, and makes secure interfacial contact therewith in order to block the vent port 616 and seal the controlled pressure zone 634. It will be appreciated that the landing zone 644 need not necessarily be recessed. For example, the annular recess 646 could be dispensed with and the landing zone 644 could instead be formed on an annular flat portion of the seal member upper side 608 itself. However, as shown in FIG. 29, one advantage of recessing the landing zone 644 within the annular recess 646 is to provide an enhanced seal by allowing the sidewall of the vent port closure member 630 to engage the sidewall of the annular recess, as shown by reference number 648.

In lieu of having an anchor member stem, the anchor member 602 may be formed with a central dome 652 on the seal member upper side 608 that is formed coaxially with the vent port 616. The central dome 652 may be generally shaped as an inverted saucer or shallow bowl that is convex on the seal member upper side 608 and concave on the seal member lower side 610. As shown in FIG. 27, the central dome 652 is sized and shaped to accommodate a discrete retainer 654 that may be used to attach the anchor member 602 to an auxiliary component in order to create an anchoring apparatus. Such an anchoring apparatus is shown in FIGS. 44-45, described in more detail below. By way of example only, the retainer 654 may include a circular button-like retainer body 656 that engages the lower surface of the central dome 652. Optionally, the retainer 654 may include an upper retainer bushing 658 that engages the sidewall of the vent port 616 and extends partially or completely through the vent port from the lower end 620 toward the upper end 618 thereof. A central retainer bore 660 extends vertically through the retainer body 656 and, if present, the retainer bushing 658. When the retainer 654 engages the anchor member 602, the retainer bore 660 serves as a liner to the anchor member's vent port 616, ensuring that there is an unobstructed air pathway from the seal member upper side 608 to the seal member lower side 610.

Turning now to FIGS. 30-33, an anchoring apparatus 700 is shown that combines the anchor member 2 of FIGS. 1-9 with two auxiliary components in order to anchor one or more items or materials (not shown) to the reference surface 4. A first auxiliary component 702 of the anchoring apparatus 700 may be mounted to the anchor member stem 22 by virtue of rigid engagement with the stem mounting portion 28. The first auxiliary component 702 may be embodied as any structure that is configured for vertically fixed mounting to the anchor member stem 22 without the use of discrete connecting members, such as fasteners, retainers, etc. This characteristic allows the anchor member 2 to be rigidly self-mounted to the first auxiliary component 702 in a stable vertically fixed relationship therewith. FIGS. 30-33 depict one example configuration wherein the first auxiliary component 702 takes the form of a rigid (or semi-rigid) main body 712 (e.g., plastic, silicone rubber, etc.) that extends outwardly away from the anchor member stem 22 for some distance. By way of example only, the main body 712 may be formed as a circular disk-like structure that surrounds the anchor member stem 22.

As previously described in connection with FIGS. 1-9, the stem mounting portion 28 may be implemented as an annular groove formed on the anchor member stem 22 between the ends 24 and 26 thereof. In that case, the first auxiliary component 702 may include a first anchor member mounting bore 704 centrally formed in its main body 712. The anchor member mounting bore 704 may extend between a bore upper end 706 and a bore lower end 708, and may have a sidewall 710 whose position is dictated by the diameter of the bore. The rigid inter-engagement of the annular groove 28 with the bore 704 may include the back of the groove engaging the bore sidewall 710. The sidewalls of the annular groove 28 may respectively engage the bore upper and lower ends 706 and 708, and extend radially outwardly therefrom to cover adjacent surface portions of the first auxiliary component's main body 712.

The first auxiliary component 702 may optionally include additional structure integrated with or otherwise connected to the main body 712. In FIGS. 30-33, the additional structure of the first auxiliary component 702 includes a secondary body 714 that extends upwardly from the periphery of the main body 712 for some distance. By way of example only, the secondary body 714 may be formed as a tube-like structure that surrounds the main body 712. If desired, a tertiary body 716 of the first auxiliary component 702 may extend downwardly from the periphery of the main body 712 to help stabilize the anchoring apparatus 700 on the reference surface 4. By way of example only, the tertiary body 716 may be formed as a tube-like structure that surrounds the main body 712 and has the same diameter as the secondary body 714. As shown in FIG. 31, the tertiary body 716 may extend down to the seal member upper side 8 when the anchoring apparatus 700 is adhered to the reference surface 4, provided that the base seal member's peripheral edge 14 extends laterally beyond the lower edge of the tertiary body. Alternatively, the tertiary body 716 may extend down to the reference surface 4 when the anchoring apparatus 700 is adhered thereto, provided that the base seal member's peripheral edge 14 lies within the perimeter of the tertiary body.

A second auxiliary component 718 of the anchoring apparatus 700 may be movable between an upper position (shown in FIG. 30) and a lower position (shown in FIG. 31). In the lower position, the second auxiliary component 718 engages the upper surface 50 of the vent port closure member 30 and forces it into its closed position to seal the controlled pressure zone 34. In the upper position, the second auxiliary component 718 lifts away from the upper surface 50 of the vent port closure member 30, thereby releasing the vent port closure member from its closed position and allowing it to bias to its open position to vent the controlled pressure zone 34.

The second auxiliary component 718 may be configured as any movable structure having the ability to engage and manipulate the vent port closure member 30 into its closed position. FIGS. 30-33 depict one example configuration wherein the second auxiliary component 718 takes the form of a rigid (or semi-rigid) main body 720 (e.g., plastic, silicone rubber, etc.) situated above the vent port closure member 30. By way of example only, the main body 720 may be formed as a circular disk-like structure that overlies the vent port closure member 30. The second auxiliary component 718 may optionally include additional structure integrated with or otherwise connected to the main body 720. In FIGS. 30-33, the additional structure of the second auxiliary component 718 includes a secondary body 722 that extends upwardly from the periphery of the main body 720 for some distance. By way of example only, the secondary body 722 may be formed as a tube-like structure that surrounds the main body 720.

In the illustrated embodiment of FIGS. 30-33, the secondary body 722 of the second auxiliary component 718 faces the secondary body 714 of the first auxiliary component 702, and is in closely spaced relationship therewith. This arrangement allows the first auxiliary component 702 to guide the second auxiliary component 718 during the latter component's up and down movement. Although FIGS. 30-33 show the secondary body 722 of the second auxiliary component 718 being nested within the secondary body 714 of the first auxiliary component 702, the relationship of parts could be reversed, such that the secondary body of the first auxiliary component is nested within the secondary body of the second auxiliary component. Although not shown, the first auxiliary component 702 and the second auxiliary component 718 may be interconnected at one or more locations to prevent inadvertent disassembly of the anchoring apparatus 700. This allows the anchoring apparatus 700 to be lifted from the reference surface 4 by grasping the second auxiliary component 718 (or another structure connected thereto), and lifting the second auxiliary component. The interconnection(s) between the auxiliary components 702 and 718 may be provided at any suitable location on the anchoring apparatus 700, in any suitable manner.

Figure 30:
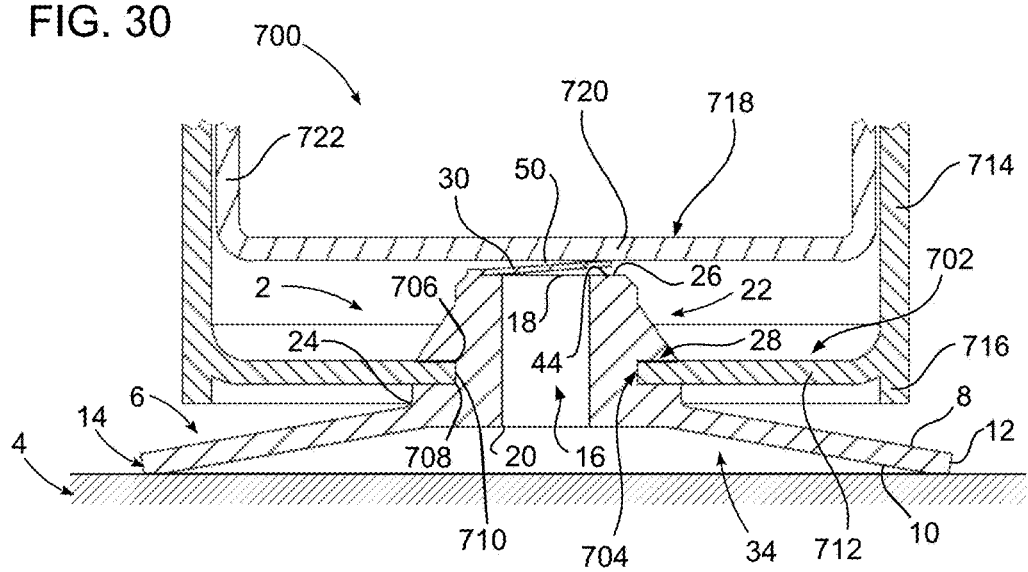
FIG. 30 is a cross-sectional centerline view showing an anchoring apparatus according to an example embodiment that incorporates the anchor member of FIG. 1, with the vent port closure member of the anchor member being open.
Figure 31:
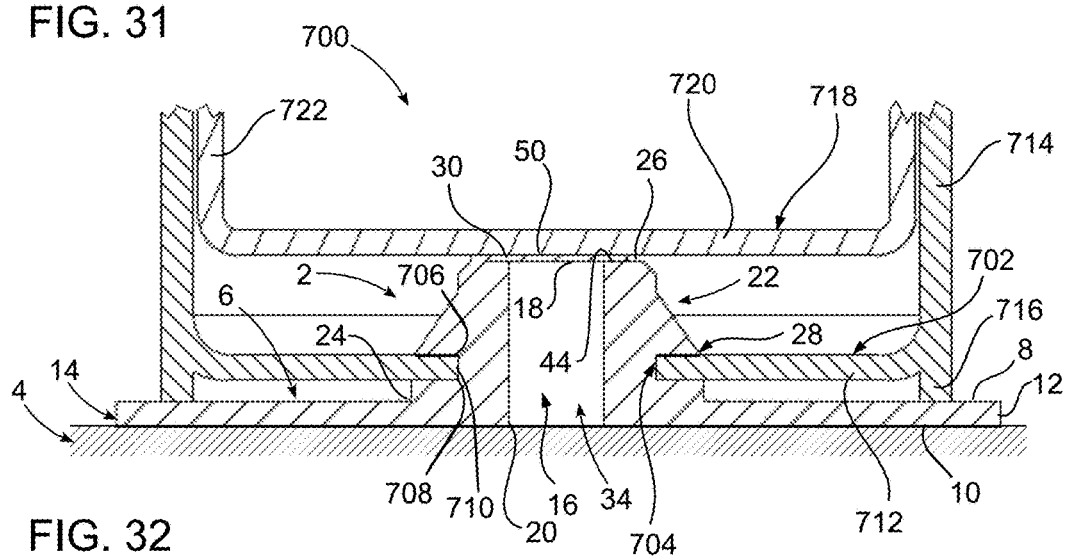
FIG. 31 is a cross-sectional centerline view showing the anchoring apparatus of FIG. 30, with the vent port closure member of the anchor member being closed.

In FIG. 30, the anchoring apparatus 700 is in a state wherein the second auxiliary component 718 has been lifted to its upper position to open the vent port closure member 30, and the anchoring apparatus is either in the process of being lowered onto the reference surface 4 or raised therefrom. Because the controlled pressure zone 34 is vented, raising the anchoring apparatus 700 may be performed without any suction resistance being offered by the base seal member 6. In the illustrated state of the anchoring apparatus 30, the seal member lower side 10 may (or may not) have a cambered concave configuration, depending on the design of the anchor member 2.

In FIG. 31, the anchoring apparatus 700 is in a state wherein it has been placed onto the reference surface 4 and the second auxiliary component 718 is in its lower position with the vent port closure member 30 being closed. Moreover, the base seal member 6 may have deformed into a state in which the seal member lower side 10 is fully or partially flattened against the reference surface 4. If the anchor member 2 is a suction cup, the seal member lower side 10 may not assume a flattened state unless the anchoring apparatus 700 is actively pushed downwardly with some degree of force. If the anchor member 2 is a properly-designed suction seal stabilizer, the weight of the anchoring apparatus 700 alone, or the anchoring apparatus in combination with whatever item(s) or material(s) it carries, may be enough to flatten the seal member lower side 10. In either case, because the controlled pressure zone 34 is no longer vented, any attempt to destabilize the anchoring apparatus 700 without raising the second auxiliary component 718 will result in suction resistance being generated by the base seal member 6, thereby maintaining the anchoring apparatus upright and in contact with the reference surface 4.

Figure 32:
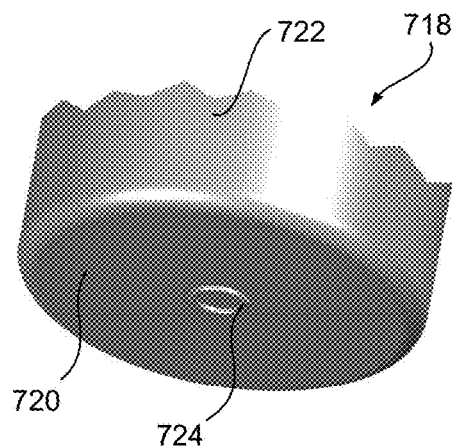
FIG. 32 is a lower perspective view showing a modified auxiliary component of the anchoring apparatus of FIG. 30.
Figure 33:
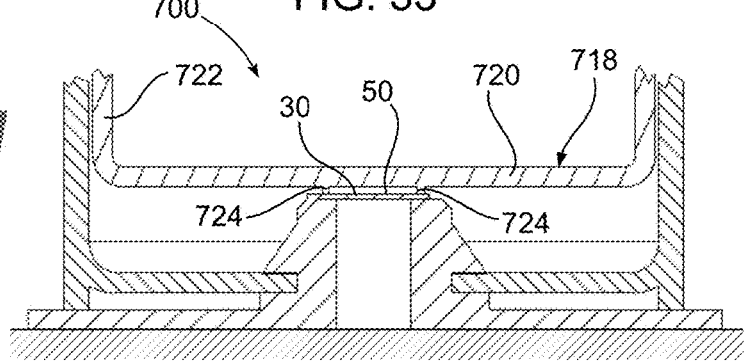
FIG. 33 is a cross-sectional centerline view showing the anchoring apparatus of FIG. 30 constructed with the modified auxiliary component of FIG. 30, with the vent port closure member of the anchor member being closed.

Comparing FIGS. 30 and 31, it will be seen that the vent port closure member 30 and the main body 720 of the second auxiliary component 718 are configured for efficient mutual engagement so as to promote superior sealing of the vent port 16. In the illustrated embodiment, the lower side of the main body 720 completely blankets the upper side 50 of the vent port closure member 30 by covering the entire surface area thereof, and may in fact be several times larger in areal extent. For example, if the main body 720 and the vent port closure member 30 are both circular, the diameter of the main body may be at least two or more times larger than the diameter of the vent port closure member. Both components may also have conforming surface configurations so as to facilitate mutual surface-to-surface engagement across the entire area of the vent port closure member 30. For example, as shown in the illustrated embodiment of FIGS. 30-31, the lower side of the main body 720 and the upper side 50 of the vent port closure member may each be substantially planar. In this way, there is little possibility that the main body 720 will not affirmatively engage the vent port closure member 30 and force it closed. As alternatively shown in FIGS. 32-33, the second auxiliary component 718 may be optionally configured with a protruding vent port closure member engagement structure 724 extending downwardly from the lower side of the main body 720. In the illustrated embodiment, the engagement structure 724 is ring shaped, and is sized and positioned to engage the upper side 50 of the vent port closure member 30 in concentric relationship therewith in the latter's closed position (as shown in FIG. 33). Other engagement structure configurations (such as a solid boss) could also be used.

If the vent port closure member 30 is implemented as a hinged flap, the main body 720 may initially engage only a small portion of the upper side 50 (e.g., an edge thereof), as shown in FIG. 30. As the second auxiliary component 718 lowers, the main body 720 will engage increasingly more of the upper side 50 until the vent port closure member 30 reaches its closed position in FIG. 31. As previously described, the main body 720 may cover the entire upper side 50 in the vent port closure member's closed position (as shown in FIG. 31), thereby producing the blanketing effect described above. Due to this blanketing relationship, and further due to the vent port closure member 30 being formed from a flexible resilient material, it will be appreciated that minor inadvertent rocking movements of the second auxiliary component 718 are not likely to result in the vent port closure member 30 opening to produce unwanted venting of the controlled pressure zone 34. To further guard against inadvertent venting, the main body 720 of the second auxiliary component 718, or at least the portion thereof that engages the vent port closure member 30 (such as the engagement structure 724 as shown in FIGS. 32-33), may also be formed of a flexible resilient material. This will result in the main body 720 partially compressing onto the upper side of the vent port closure member 30, with the latter indenting into the former, so as to thereby maintain affirmative inter-facial engagement therewith notwithstanding small movements of the second auxiliary component 718.

It will be seen that the anchoring apparatus 700 may be implemented as a three-component assembly whose components include the anchor member 2, the first auxiliary component 702, and the second auxiliary component 718. When the anchoring apparatus 700 is resting on the support surface 4 in the manner shown in FIG. 31, a user can grasp the secondary body 722 of the second auxiliary component 718, or a structure attached thereto (not shown), and lift the anchoring apparatus upwardly in a normal manner. Doing so will lift the second auxiliary component 718, allowing the vent port closure member 30 of the anchor member 2 to bias upwardly to its open position (as shown in FIG. 30), and thereby vent the controlled pressure zone 34. The anchoring apparatus 700 may then be lifted away from the reference surface 4 without any apparent resistance above and beyond the weight of the anchoring apparatus and any item(s) or material(s) being carried thereby. If, on the other hand, the anchoring apparatus 700 is resting on the reference surface 4 and is impacted by a side load that would otherwise tip the anchoring apparatus and dislodge or spill the item(s) or material(s) carried thereby, the vent port closure member 30 will remain closed so long as it is urged to do so by the main body 720 of the second auxiliary component 718, and the anchoring apparatus will not tip due to a negative pressure differential having developed in the controlled pressure zone 34.

Turning now to FIGS. 34-37, an alternative anchoring apparatus 800 is shown that is substantially the same as the anchoring apparatus 700 of FIGS. 30-33, and may be formed from the same materials, but has auxiliary components constructed in a particular manner according to an intended use of the anchoring apparatus. Correspondence between components of the embodiment of FIGS. 34-37 and like components of the embodiment of FIGS. 30-33 is indicated by using corresponding reference numbers incremented by 100.

In the anchoring apparatus 800, a first auxiliary component 802 may include circular disk-like main body 812 that is rigidly self-mounted to the anchor member stem 22 of the anchor member 2. A tube-like secondary body 814 of the first auxiliary component 802 may extend upwardly from the periphery of the main body 812 to a circular upper edge 824. A tube-like tertiary body 816 of the first auxiliary component 802 may extend downwardly from the periphery of the main body 812 to help stabilize the anchoring apparatus 800 on the reference surface 4. A second auxiliary component 818 may include a circular disk-like main body 820 on which is formed a tube-like secondary body 826. The secondary body 826 extends upwardly from a central location on the main body 820 as a mounting post that can be used to mount one or more items or materials "A" to be carried by the anchoring apparatus 800, or a further auxiliary component (not shown) that carries one or more items or materials. The exterior of the mounting post 826 may be formed as a stepped cylinder so as to have a lower, larger diameter section 826A proximate to the second auxiliary component 818 and an upper, smaller diameter section 826B disposed above the larger diameter section. The interior of the mounting post 826 may be hollow (as shown), or it may be solid.

The anchoring apparatus 800 may further include an optional cap member 828 disposed on the upper edge 824 of the secondary body 814 of the first auxiliary component 802, thereby forming part of the first auxiliary component. In the illustrated embodiment, the cap member's main body 830 covers the opening formed by the upper edge 824 of the first auxiliary component's secondary body 814. The main body 830 may be formed as a circular disk-like structure whose peripheral edge is connected to the upper edge 824. This connection may be permanent, or it may be non-permanent (e.g., a snap-in connection) so as to allow for disassembly of the anchoring apparatus 800 and/or optional use/non-use of the cap member 828. The plate-like configuration of the cap member's main body 830 provides a surface for carrying one or more items or materials "B," thereby allowing the cap member 828, and by extension the first auxiliary component 802 on which it is mounted, to function as an item or material carrier (in addition to or in lieu of the second auxiliary component 818). Non-planar configurations may also be used for the cap member's main body 830. The secondary body 822 of the second auxiliary component 818 may be sized so that its upper edge 834 is spaced a short distance below the main body 830. In this way, the main body 830 may serve as a stop that limits upward movement of the second auxiliary component 818 so as to prevent disassembly of the anchoring apparatus 800 during normal use.

The secondary body 832 of the cap member 828 may be disposed at the center of the cap member's main body 830, in substantial axial alignment with the mounting post 826. By way of example only, the secondary body 832 is formed as a downwardly-extending tubular sleeve that is configured to slidably receive the upper section 826B of the mounting post 826. The mounting post 826 may extend through the sleeve 832 and terminate at a location above the main body 830. The bore of the sleeve 832 may be sized to accommodate the smaller diameter of the upper section 826B of the mounting post 826, but block passage of the larger diameter lower section 826A. This allows the bottom of the sleeve 832 to optionally function as a stop that limits upward travel of the second auxiliary component 818.

Figure 34:
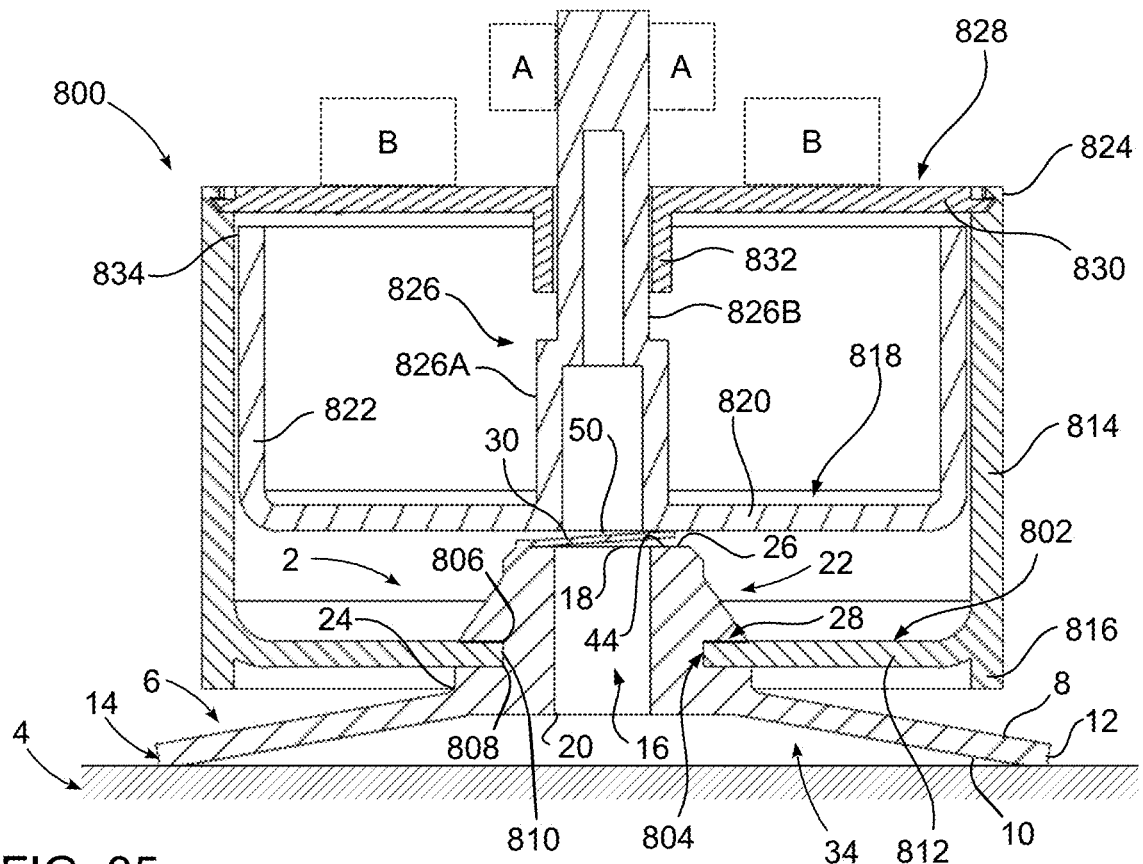
FIG. 34 is a cross-sectional centerline view showing an anchoring apparatus according to another embodiment that incorporates the anchor member of FIG. 1, with the vent port closure member of the anchor member being open.

It will be seen that the anchoring apparatus 800 may be implemented as a three-component assembly whose components include the anchor member 2, the first auxiliary component 802 (including the cap member 828), and the second auxiliary component 818. When the anchoring apparatus 800 is resting on the support surface 4 in the manner shown in FIG. 35, a user can grasp the exposed upper end of mounting post 826, or a structure mounted thereto (not shown), and lift the anchoring apparatus upwardly in a normal manner. Doing so will lift the second auxiliary component 818, allowing the vent port closure member 30 of the anchor member 2 to bias upwardly to its open position (as shown in FIG. 34), and thereby vent the controlled pressure zone 34. As a result, the anchoring apparatus 800 may then be lifted away from the reference surface 4 without any apparent resistance above and beyond the weight of the anchoring apparatus and the items or materials "A" and "B" being carried. If, on the other hand, the anchoring apparatus 800 is resting on the reference surface 4 and is impacted by a side load that would otherwise tip the anchoring apparatus and dislodge or spill the items or materials "A" or "B," the anchor member's vent port closure member 30 will remain closed so long as it is urged to do so by the main body 820 of the second auxiliary component 818, and the anchoring apparatus will not tip due to a negative pressure differential having developed in the controlled pressure zone 34.

Figure 35:
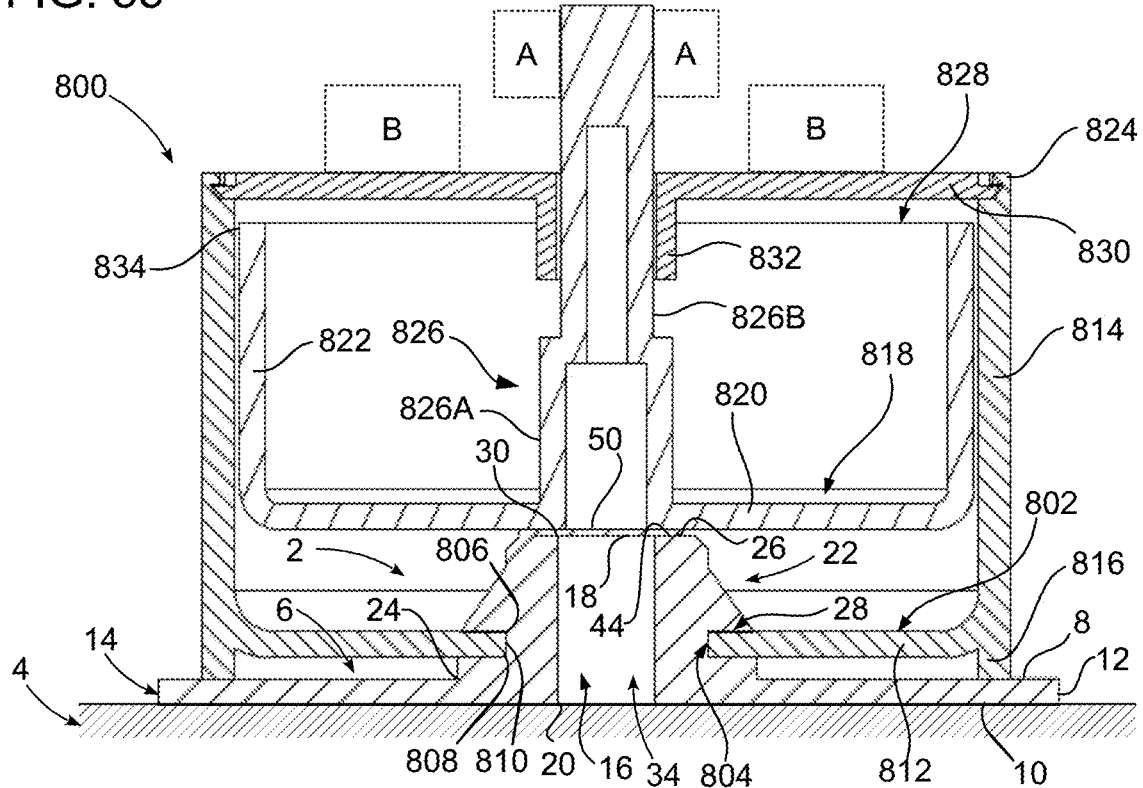
FIG. 35 is a cross-sectional centerline view showing the anchoring apparatus of FIG. 34, with the vent port closure member of the anchor member being closed.
Figure 34A:
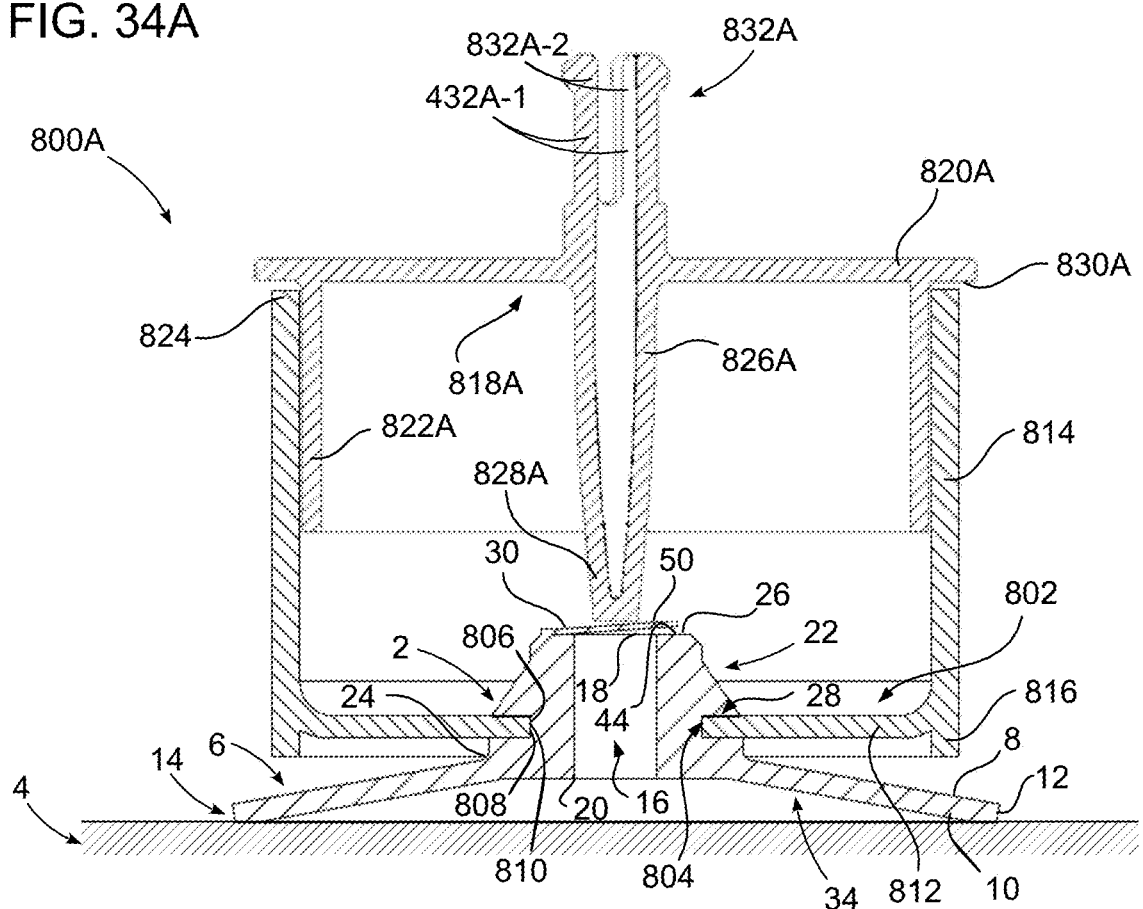
FIG. 34A is a cross-sectional centerline view showing a modified version of the anchoring apparatus of FIG. 34, with the vent port closure member of the anchor member being open.
Figure 35A:
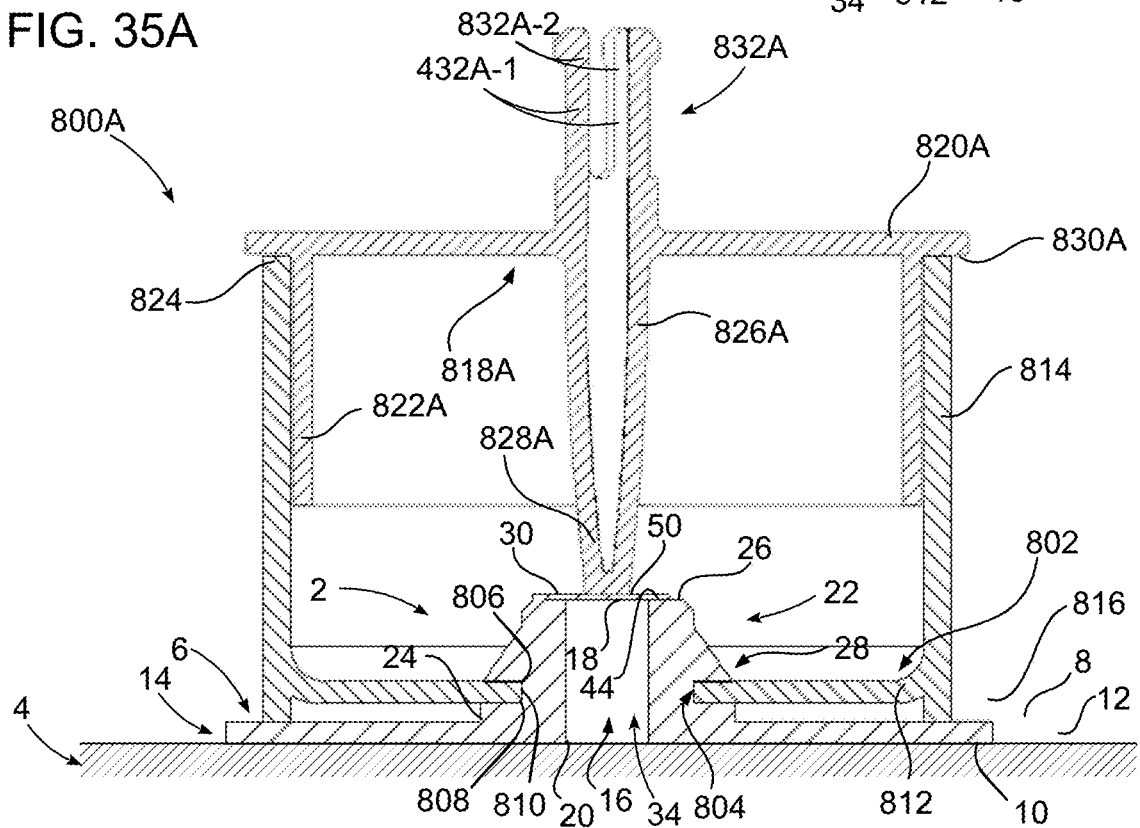
FIG. 35A is a cross-sectional centerline view showing a modified version of the anchoring apparatus of FIG. 34, with the vent port closure member of the anchor member being closed.

Turning now to FIGS. 34A and 35A, a modified version 800A of the anchoring apparatus 800 is shown that uses an alternative second auxiliary component 818A that differs from the second auxiliary component 818 of FIGS. 34-35. The alternative second auxiliary component 818A is vertically movable relative to the first auxiliary component 802 between a lower position and an upper position. The second auxiliary component 818A may include a circular disk-like main body 820A on which is formed a tube-like secondary body 822A. The secondary body 822A extends downwardly from the main body 820A at a location that is proximate to the main body periphery. The outside surface of the second auxiliary component's secondary body 822A may be in opposing closely spaced relationship with the inside surface of the first auxiliary component's secondary body 814 to help guide the second auxiliary component's vertical motion.

The underside of the second auxiliary component's main body 820A is formed with a non-planar stem engagement structure 826A in the form of a central elongated post protrusion that extends downwardly from the lower side of the main body. In the illustrated embodiment, the stem engagement structure 826A is cylindrical at its upper end and has a tapered tip 828A at its lower end. The stem engagement structure 826A is sized and positioned to engage the upper side 50 of the vent port closure member 30, and thereby actuate the vent port closure member into and out of sealing engagement with the vent port 16. Although the interior of the stem engagement structure 826A is shown as being hollow along most of its length, a solid design could also be used.

In order to limit the downward travel of the second auxiliary component 818A, the main body 820A of the second auxiliary component may include a peripheral lip 830A that extends radially beyond the second auxiliary component's secondary body 822A, and also beyond the secondary body 814 of the first auxiliary component 808. The peripheral lip 830A will contact the upper end 824 of the secondary body 814 when the second auxiliary component 818A reaches is lower position. This contact between the peripheral lip 830A and the upper end 824 of the secondary body 814 prevents the stem engagement structure 826A from indenting too far into the vent port closure member 30, which could in some situations result in the vent port closure member becoming distorted to the point of unsealing the vent port 16.

The main body 820A of the second auxiliary component 818A may be configured as a universal carrier that can mount any number of separate attachments, each of which is configured for holding one or more specific items. In particular, a universal mounting structure 832A may extend upwardly from the center (or other location) of the main body 820A. The universal mounting structure 832A may take the form of a male connector with two closely-spaced vertical prongs 832A-1 of hemispherical cross-section, each having a radially outwardly-extending flange 832A-2 on its free end. Many other connector designs could also be used. Attachments (not shown) to be connected to the mounting structure 832A may be formed with counterpart female connectors.

Figure 36:
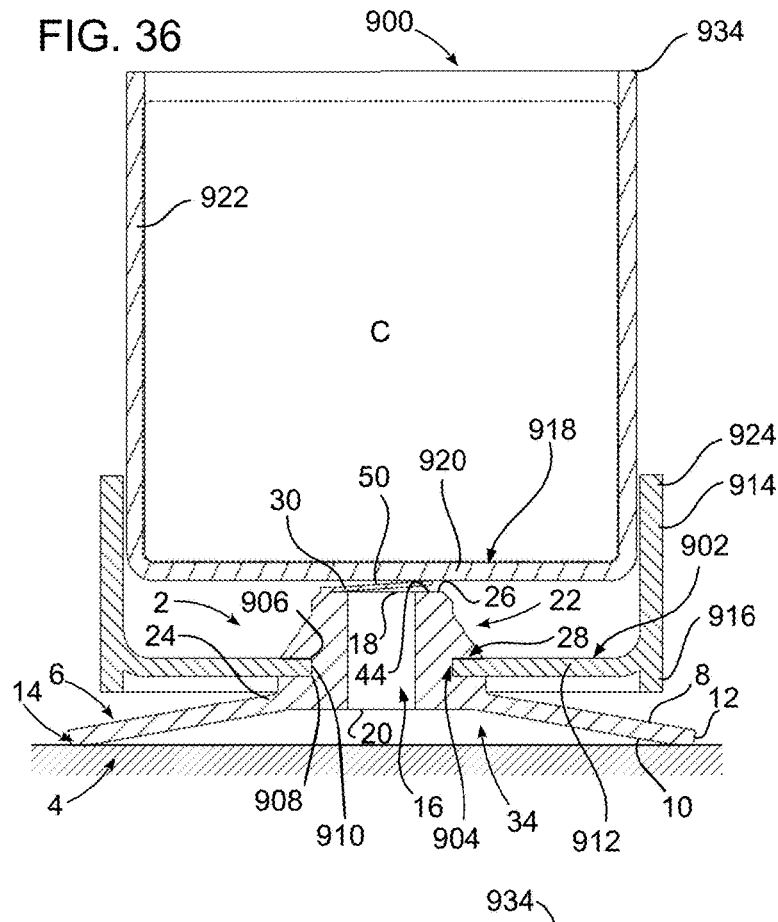
FIG. 36 is a cross-sectional centerline view showing an anchoring apparatus according to another embodiment that incorporates the anchor member of FIG. 1, with the vent port closure member of the anchor member being open.
Figure 37:
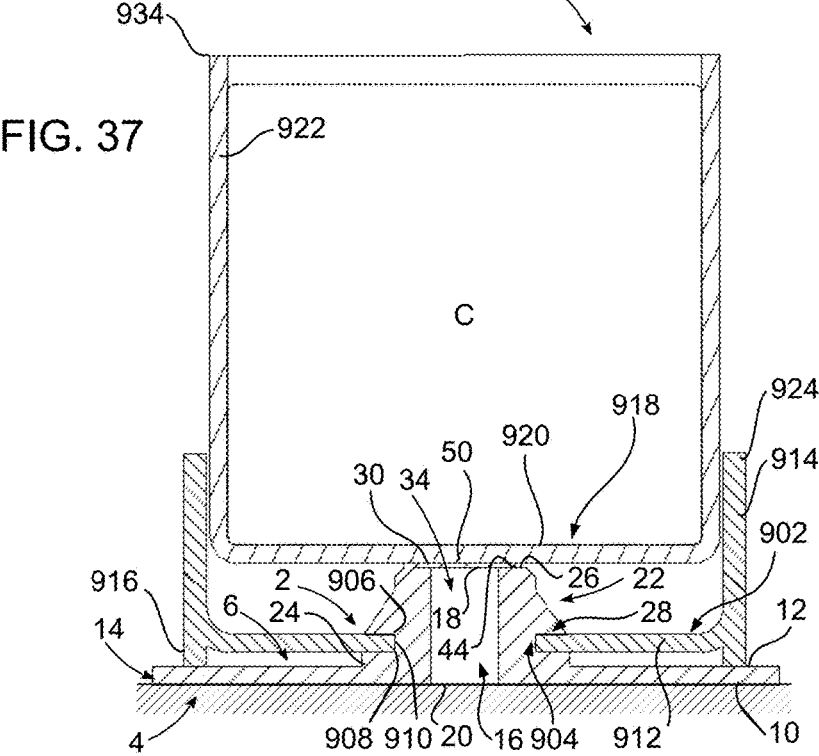
FIG. 37 is a cross-sectional centerline view showing the anchoring apparatus of FIG. 36, with the vent port closure member of the anchor member being closed.

Turning now to FIGS. 36-37, an alternative anchoring apparatus 900 is shown that is substantially the same as the anchoring apparatus 700 of FIGS. 30-33, and may be formed from the same materials, but has alternative auxiliary components constructed in a particular manner according to an intended use of the anchoring apparatus. Correspondence between components of the embodiment of FIGS. 36-37 and like components of the embodiment of FIGS. 30-33 is indicated by using corresponding reference numbers incremented by 200.

In the anchoring apparatus 900, a first auxiliary component 902 may include a circular disk-like main body 912 that is rigidly self-mounted to the anchor member stem 22 of the anchor member 2. A tube-like secondary body 914 may extend upwardly from the periphery of the main body 912 to a circular upper edge 924. A tube-like tertiary body 916 of the first auxiliary component 902 may extend downwardly from the periphery of the main body 912 to help stabilize the anchoring apparatus 900 on the reference surface 4. A second auxiliary component 918 may include a circular disk-like main body 920. A tube-like secondary body 922 may extend upwardly from the main body 920 to a circular upper edge 934. The second auxiliary component 918 may serve as a closed-bottom, open-top vessel whose hollow interior carries a material "C," which may be a solid or a liquid. For example, the anchoring apparatus 900 may serve as a drinking vessel, with the secondary body 922 of the second auxiliary component 918 providing a grasping portion.

It will be seen that the anchoring apparatus 900 may be implemented as a three-component assembly whose components include the anchor member 2, the first auxiliary component 902, and the second auxiliary component 918. When the anchoring apparatus 900 is resting on the support surface 4 in the manner shown in FIG. 37, a user can grasp the secondary body 922 of the second auxiliary component 918 and lift the anchoring apparatus upwardly in a normal manner. Doing so will lift the second auxiliary component 918, allowing the vent port closure member 30 of the anchor member 2 to bias upwardly to its open position (as shown in FIG. 36), and thereby vent the controlled pressure zone 34. As a result, the anchoring apparatus 900 may then be lifted away from the reference surface 4 without any apparent resistance above and beyond the weight of the anchoring apparatus and the item or material "C" being carried. If, on the other hand, the anchoring apparatus 900 is resting on the reference surface 4 and is impacted by a side load that would otherwise tip the anchoring apparatus and spill the item or material "C," the anchor member's vent port closure member 30 will remain closed so long as it is urged to do so by the main body 920 of the second auxiliary component 918, and the anchoring apparatus will not tip due to a negative pressure differential having developed in the controlled pressure zone 34.

Turning now to FIGS. 38-39, an alternative anchoring apparatus 1000 is shown that is substantially the same as the anchoring apparatus 700 of FIGS. 30-33, and may be formed from the same materials, but has alternative auxiliary components constructed in a particular manner according to an intended use of the anchoring apparatus. Correspondence between components of the embodiment of FIGS. 38-39 and like components of the embodiment of FIGS. 30-33 is indicated by using corresponding reference numbers incremented by 300.

In the anchoring apparatus 1000, a first auxiliary component 1002 may include a circular disk-like main body 1012 that is rigidly self-mounted to the anchor member stem 22 of the anchor member 2. A tube-like secondary body 1014 of the first auxiliary component 1002 may extend upwardly from the periphery of the main body 1012. A circular upper end portion of the secondary body 1014 may include one or more circumferentially spaced flanges 1024 that extend laterally outwardly. A tube-like tertiary body 1016 of the first auxiliary component 1002 may extend downwardly from the periphery of the main body 1012 to help stabilize the anchoring apparatus 1000 on the reference surface 4. A second auxiliary component 1018 may include a circular disk-like main body 1020. A tube-like secondary body 1022 of the second auxiliary component 1018 may extend upwardly from the main body 1020 to a circular upper edge 1034. The second auxiliary component 1018 may serve as a closed-bottom, open-top beverage container whose hollow interior carries a material "D," which may be a solid or a liquid. For example, the anchoring apparatus 1000 may serve as a travel mug, with the secondary body 1022 of the second auxiliary component 1018 providing a grasping portion. In that case, the area of the second auxiliary component 1018 proximate to the upper edge 1034 may have threads 1036 for removably attaching a lid (not shown). As also shown, the outer surface of the secondary body 1022 may be ergonomically tapered for user convenience, such as by creating a bulge near the upper edge 1034.

The second auxiliary component 1018 may be slidably mounted to the first auxiliary component 1002 by way of a tube-like tertiary body 1036 of the second auxiliary component that extends downwardly from the secondary body 1022 below the main body 1020. The secondary body 1014 of the first auxiliary component 1002 may be slidably nested within the tertiary body 1036 of the second auxiliary component 1018. A circular lower end portion of the tertiary body 1036 may be formed with one or more circumferentially spaced flanges 1038 that extend laterally inwardly. As shown in FIG. 38, the inwardly extending flanges 1038 of the second auxiliary component's tertiary body 1036 will engage the outwardly extending flanges 1024 of the first auxiliary component's secondary body 1014 when the second auxiliary component 1018 reaches its upper position. This engagement will prevent inadvertent separation of second auxiliary component 1018 from the first auxiliary component 1002 during normal use of the anchoring apparatus 1000. As can be seen in both FIGS. 38 and 39, the base seal member 6 of the anchor member 2 may be nested entirely within the area defined by the periphery of the tertiary body 1036 of the second auxiliary component 1018, or even the tertiary body 1016 of the first auxiliary component 1002, which facilitates compact design.

It will be seen that the anchoring apparatus 1000 may be implemented as a three-component assembly whose components include the anchor member 2, the first auxiliary component 1002, and the second auxiliary component 1018. When the anchoring apparatus 1000 is resting on the support surface 4 in the manner shown in FIG. 39, a user can grasp the secondary body 1022 of the second auxiliary component 1018 and lift the anchoring apparatus upwardly in a normal manner. Doing so will lift the second auxiliary component 1018, allowing the vent port closure member 30 of the anchor member 2 to bias upwardly to its open position (as shown in FIG. 38), and thereby vent the controlled pressure zone below the base seal member 6. As a result, the anchoring apparatus 1000 may then be lifted away from the reference surface 4 without any apparent resistance above and beyond the weight of the anchoring apparatus and the item or material "D" being carried. If, on the other hand, the anchoring apparatus 1000 is resting on the reference surface 4 and is impacted by a side load that would otherwise tip the anchoring apparatus and spill the item or material "D," the anchor member's vent port closure member will remain closed so long as it is urged to do so by the main body 1020 of the second auxiliary component 1018, and the anchoring apparatus will not tip due to negative pressure differential having developed in the controlled pressure zone.

Turning now to FIGS. 40-41, an alternative anchoring apparatus 1100 is shown that is substantially the same as the anchoring apparatus 700 of FIGS. 30-33, and may be formed from the same materials, but has alternative auxiliary components constructed in a particular manner according to an intended use of the anchoring apparatus. Correspondence between components of the embodiment of FIGS. 40-41 and like components of the embodiment of FIGS. 30-33 is indicated by using corresponding reference numbers incremented by 400.

In the anchoring apparatus 1100, a first auxiliary component 1102 may include a circular disk-like main body 1112 that is rigidly self-mounted to the anchor member stem 22 of the anchor member 2. A tube-like secondary body 1114 of the first auxiliary component 1102 may extend upwardly from the periphery of the main body 1112. A circular upper end portion of the secondary body 1114 may include one or more circumferentially spaced flanges 1124 that extend laterally outwardly. A tube-like tertiary body 1116 of the first auxiliary component 1102 may extend downwardly from the periphery of the main body 1112 to help stabilize the anchoring apparatus 1000 on the reference surface 4. A second auxiliary component 1118 may include a circular disk-like main body 1120. A tube-like secondary body 1122 of the second auxiliary component 1118 may extend downwardly from the periphery of the main body 1120. A circular lower end portion of the secondary body 1122 may include one or more circumferentially spaced flanges 1126 that extend laterally inwardly.

The secondary body 1114 of the first auxiliary component 1102 may be slidably nested within the secondary body 1122 of the second auxiliary component 1118. As shown in FIG. 40, the inwardly extending flanges 1126 of the second auxiliary component's secondary body 1122 will engage the outwardly extending flanges 1124 of the first auxiliary component's secondary body 1114 when the second auxiliary component 1118 reaches its upper position. This engagement will prevent inadvertent separation of second auxiliary component 1118 from the first auxiliary component 1102 during normal use of the anchoring apparatus 1100. As can be seen in both FIGS. 40 and 41, the base seal member 6 of the anchor member 2 may be nested entirely within the area defined by the periphery of the secondary body 1122, or additionally within the tertiary body 1116 of the first auxiliary component 1102, which facilitates compact design.

A third auxiliary component 1128 of the anchoring apparatus 1100 may be mounted on the second auxiliary component 1118. The third auxiliary component 1128 may include a disk-like main body 1130 that covers the main body 1120 of the second auxiliary component 1118. A tube-like secondary body 1132 of the third auxiliary component 1128 may extend upwardly from the periphery of the main body 1130 to a circular upper edge 1134. The third auxiliary component 1128 may serve as a closed-bottom, open-top beverage container whose hollow interior carries a material "E," which may be a solid or a liquid. For example, the anchoring apparatus 1100 may serve as a travel mug, with the secondary body 1132 of the third auxiliary component 1128 providing a grasping portion. In that case, the area of the third auxiliary component 1128 proximate to the upper edge 1134 may have threads 1136 for removably attaching a lid (not shown). As also shown, the outer surface of the secondary body 1122 may be ergonomically tapered for user convenience, such as by creating a bulge near the upper edge 1134. The third auxiliary component 1128 may further include a tertiary body 1138 that extends downwardly from the periphery of the main body 1130 and covers the outside surface of the second auxiliary component's secondary body 1122, or a portion thereof.

Figure 42:
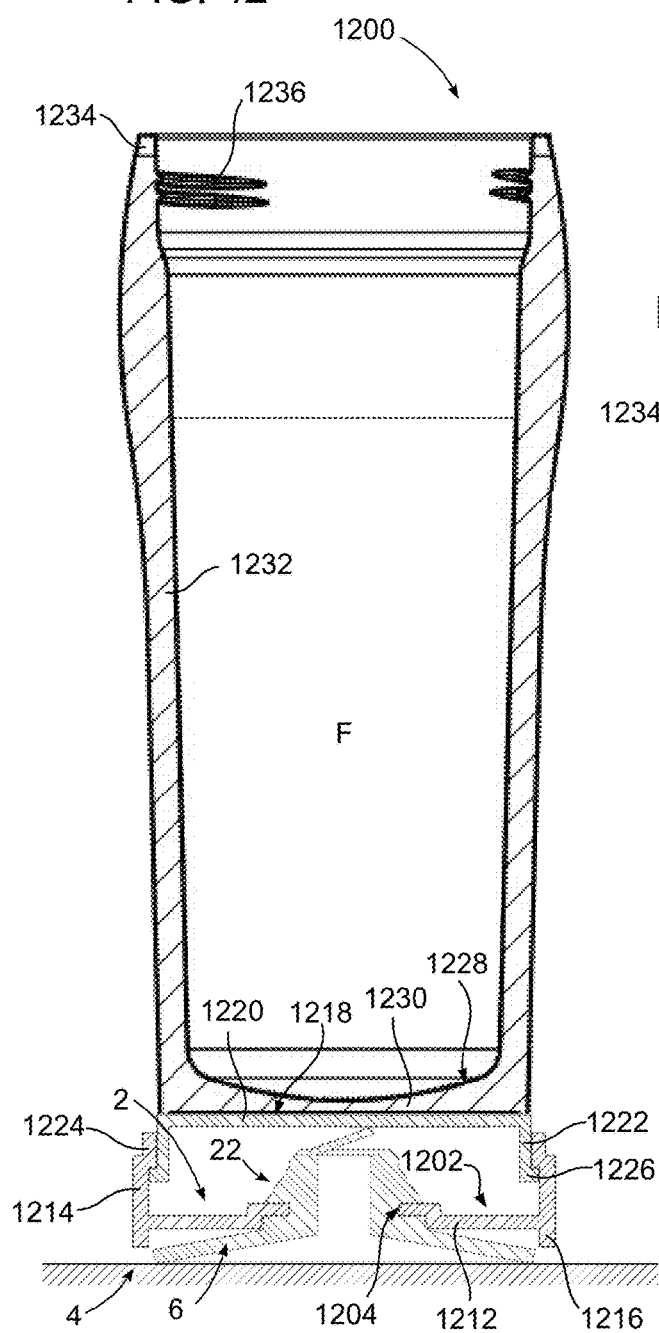
FIG. 42 is a cross-sectional centerline view showing an anchoring apparatus according to another embodiment that incorporates the anchor member of FIG. 1, with the vent port closure member of the anchor member being open.

It will be seen that the anchoring apparatus 1100 may be implemented as a four-component assembly whose components include the anchor member 2, the first auxiliary component 1102, the second auxiliary component 1118, and the third auxiliary component 1128. When the anchoring apparatus 1100 is resting on the support surface 4 in the manner shown in FIG. 41, a user can grasp the secondary body 1132 of the third auxiliary component 1128 and lift the anchoring apparatus upwardly in a normal manner. Doing so will lift the second auxiliary component 1118, allowing the vent port closure member 30 of the anchor member 2 to bias upwardly to its open position (as shown in FIG. 42), and thereby vent the controlled pressure zone below the base seal member 6. As a result, the anchoring apparatus 1100 may then be lifted away from the reference surface 4 without any apparent resistance above and beyond the weight of the anchoring apparatus and the item or material "E" being carried. If, on the other hand, the anchoring apparatus 1100 is resting on the reference surface 4 and is impacted by a side load that would otherwise tip the anchoring apparatus and spill the item or material "E," the anchor member's vent port closure member 30 will remain closed so long as it is urged to do so by the main body 1120 of the second auxiliary component 1218, and the anchoring apparatus will not tip due to a negative pressure differential having developed in the controlled pressure zone.

Figure 43:
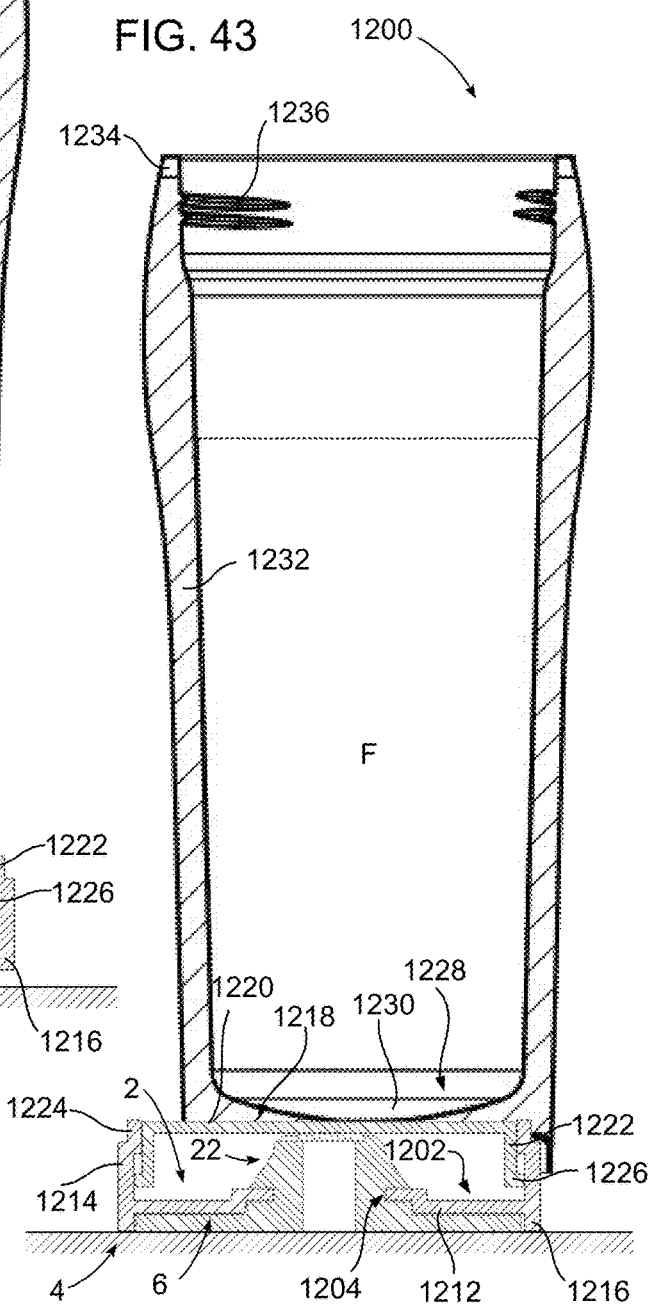
FIG. 43 is a cross-sectional centerline view showing the anchoring apparatus of FIG. 42, with the vent port closure member of the anchor member being closed.

Turning now to FIGS. 42-43, an alternative anchoring apparatus 1200 is shown that is substantially the same as the anchoring apparatus 700 of FIGS. 30-33, and may be formed from the same materials, but has alternative auxiliary components constructed in a particular manner according to an intended use of the anchoring apparatus. Correspondence between components of the embodiment of FIGS. 42-43 and like components of the embodiment of FIGS. 30-33 is indicated by using corresponding reference numbers incremented by 500.

In the anchoring apparatus 1200, a first auxiliary component 1202 may include a circular disk-like main body 1212 that is rigidly self-mounted to the anchor member stem 22 of the anchor member 2. A tube-like secondary body 1214 of the first auxiliary component 1202 may extend upwardly from the periphery of the main body 1212. A circular upper end portion of the secondary body 1214 may include one or more circumferentially spaced flanges 1224 that extend laterally inwardly. A tube-like tertiary body 1216 of the first auxiliary component 1202 may extend downwardly from the periphery of the main body 1212 to help stabilize the anchoring apparatus 1200 on the reference surface 4. A second auxiliary component 1218 may include a circular disk-like main body 1220. A tube-like secondary body 1222 of the second auxiliary component 1218 may extend downwardly from the periphery of the main body 1220. A circular lower end portion of the secondary body 1222 may include one or more circumferentially spaced flanges 1226 that extend laterally outwardly. The secondary body 1222 of the second auxiliary component 1218 may be slidably nested within the secondary body 1214 of the first auxiliary component 1202. As shown in FIG. 42, the outwardly extending flanges 1226 of the second auxiliary component's secondary body 1222 will engage the inwardly extending flanges 1224 of the first auxiliary component's secondary body 1214 when the second auxiliary component 1218 reaches its upper position. This engagement will prevent inadvertent separation of second auxiliary component 1218 from the first auxiliary component 1202 during normal use of the anchoring apparatus 1200. As can be seen in both FIGS. 42 and 43, the base seal member 6 of the anchor member 2 may be nested entirely within the area defined by the periphery of the tertiary body 1216 that extends downwardly from the periphery of the main body 1212, which facilitates compact design.

A third auxiliary component 1228 of the anchoring apparatus 1200 may be mounted on the second auxiliary component 1218. The third auxiliary component 1228 may include a disk-like main body 1230 that covers the main body 1220 of the second auxiliary component 1218. A tube-like secondary body 1232 of the third auxiliary component 1228 may extend upwardly from the periphery of the main body 1230 to a circular upper edge 1234. The third auxiliary component 1128 may serve as a closed-bottom, open-top beverage container whose hollow interior carries a material "F," which may be a solid or a liquid. For example, the anchoring apparatus 1200 may serve as a travel mug, with the secondary body 1232 of the third auxiliary component 1228 providing a grasping portion. In that case, the area of the third auxiliary component 1228 proximate to the upper edge 1234 may have threads 1236 for removably attaching a lid (not shown). As also shown, the outer surface of the secondary body 1222 may be ergonomically tapered for user convenience, such as by creating a bulge near the upper edge 1234.

It will be seen that the anchoring apparatus 1200 may be implemented as a four-component assembly whose components include the anchor member 2, the first auxiliary component 1202, the second auxiliary component 1218, and the third auxiliary component 1228. When the anchoring apparatus 1200 is resting on the support surface 4 in the manner shown in FIG. 43, a user can grasp the secondary body 1232 of the third auxiliary component 1228 and lift the anchoring apparatus upwardly in a normal manner. Doing so will lift the second auxiliary component 1218, allowing the vent port closure member 30 of the anchor member 2 to bias upwardly to its open position (as shown in FIG. 44), and thereby vent the controlled pressure zone below the base seal member 6. As a result, the anchoring apparatus 1200 may then be lifted away from the reference surface 4 without any apparent resistance above and beyond the weight of the anchoring apparatus and the item or material "F" being carried. If, on the other hand, the anchoring apparatus 1200 is resting on the reference surface 4 and is impacted by a side load that would otherwise tip the anchoring apparatus and spill the item or material "F," the anchor member's vent port closure member 30 will remain closed so long as it is urged to do so by the main body 1220 of the second auxiliary component 1218, and the anchoring apparatus will not tip due to a negative pressure differential having developed in the controlled pressure zone.

Turning now to FIGS. 44-45, an alternative anchoring apparatus 1300 is shown that is substantially the same as the anchoring apparatus 700 of FIGS. 30-33, and may be formed from the same materials, but uses the stemless anchor member 602 of FIGS. 26-29 and has alternative auxiliary components constructed in a particular manner according to an intended use of the anchoring apparatus. Correspondence between components of the embodiment of FIGS. 44-45 and like components of the embodiment of FIGS. 30-33 is indicated by using corresponding reference numbers incremented by 600.

In the anchoring apparatus 1300, the anchor member 602 may be attached to a first auxiliary component 1302 using the retainer 654 of FIG. 27. As previously described, the retainer 654 may include a retainer body 656 having a circular button-like configuration and a raised center bushing 658 that extends through some or all of the anchor member's vent port 616. The retainer body 656 engages the lower side 610 of the anchor member's central dome 652 and sandwiches the anchor member 602 against a circular disk-like main body 1312 of the first auxiliary component 1302. The main body 1312 has a central opening that receives a center portion of the anchor member's central dome 652 that includes the vent port closure member 630 and surrounding structure. The vent port closure member 630 is thus exposed on the upper side of the main body 1312. One or more fasteners 654A (e.g., rivets, screws, etc.) may extend through the retainer 654 and the central dome 652, and anchor into the main body 1312 to secure the connection. Other forms of attachment, such as adhesive bonding, may also be used.

A tube-like secondary body 1314 of the first auxiliary component 1302 may extend upwardly from the periphery of the main body 1312. A circular upper end portion of the secondary body 1314 may include one or more circumferentially spaced flanges 1324 that extend laterally outwardly. A tube-like tertiary body 1316 of the first auxiliary component 1302 may extend downwardly from the periphery of the main body 1312 to help stabilize the anchoring apparatus 1300 on the reference surface 4. A second auxiliary component 1318 may include a circular disk-like main body 1320. The main body 1320 of the second auxiliary component 1318 may be optionally formed (as needed) with a protruding vent port closure member engagement structure 1320A. The vent port closure member engagement structure 1320A may extend downwardly from the lower side of the main body 1320 to engage the vent port closure member 630 of the anchor member 602. A tube-like secondary body 1322 of the second auxiliary component 1318 may extend downwardly from the periphery of the main body 1320 to a lower end portion that may include one or more circumferentially spaced flanges 1326 that extend laterally inwardly. The secondary body 1314 of the first auxiliary component 1302 may be slidably nested within the secondary body 1322 of the second auxiliary component 1318. As shown in FIG. 44, the inwardly extending flanges 1326 of the second auxiliary component's secondary body 1322 will engage the outwardly extending flanges 1324 of the first auxiliary component's secondary body 1314 when the second auxiliary component 1318 reaches its upper position. This engagement will prevent inadvertent separation of second auxiliary component 1318 from the first auxiliary component 1302 during normal use of the anchoring apparatus 1300. As can be seen in both FIGS. 44 and 45, the base seal member 606 of the anchor member 602 may be nested entirely within the area defined by the periphery of the tertiary body 1316 that extends downwardly from the periphery of the main body 1312, which facilitates compact design.

A third auxiliary component 1328 of the anchoring apparatus 1300 may be mounted on the second auxiliary component 1318. The third auxiliary component 1328 may include a circular disk-like main body 1330 that covers the main body 1320 of the second auxiliary component 1318. A tube-like secondary body 1332 of the third auxiliary component 1328 may extend upwardly from the periphery of the main body 1330 to a circular upper edge 1334. The third auxiliary component 1328 may serve as a closed-bottom, open-top beverage container whose hollow interior carries a material "G," which may be a solid or a liquid. For example, the anchoring apparatus 1300 may serve as a travel mug, with the secondary body 1332 of the third auxiliary component 1328 providing a grasping portion. In that case, the area of the third auxiliary component 1328 proximate to the upper edge 1334 may have threads 1336 for removably attaching a lid (not shown). As also shown, the outer surface of the secondary body 1322 may be ergonomically tapered for user convenience, such as by creating a bulge near the upper edge 1334. Like the first and second auxiliary components 1302 and 1328, the third auxiliary component 1328 may be formed of any suitable rigid (or semi-rigid) material, such as plastic, silicone rubber, etc.

It will be seen that the anchoring apparatus 1300 may be implemented as a four-component assembly whose components include the anchor member 602, the first auxiliary component 1302, the second auxiliary component 1318, and the third auxiliary component 1328. When the anchoring apparatus 1300 is resting on the support surface 4 in the manner shown in FIG. 45, a user can grasp the secondary body 1332 of the third auxiliary component 1328 and lift the anchoring apparatus upwardly in a normal manner. Doing so will lift the second auxiliary component 1318, allowing the vent port closure member 630 of the anchor member 602 to bias upwardly to its open position (as shown in FIG. 464), and thereby vent the controlled pressure zone below the base seal member 606. As a result, the anchoring apparatus 1300 may then be lifted away from the reference surface 4 without any apparent resistance above and beyond the weight of the anchoring apparatus and the item or material "G" being carried. If, on the other hand, the anchoring apparatus 1300 is resting on the reference surface 4 and is impacted by a side load that would otherwise tip the anchoring apparatus and spill the item or material "G," the anchor member's vent port closure member 630 will remain closed so long as it is urged to do so by the main body 1320 of the second auxiliary component 1318, and the anchoring apparatus will not tip due to a negative pressure differential having developed in the controlled pressure zone.

It will be appreciated that the various anchoring apparatus described above in connection with FIGS. 30-45 could be embodied in many other shapes and sizes to provide different types of containers, including but not limited to bowls, buckets, cans, vases, urns, tanks, or any other receptacle apparatus whose function is to hold various types of spillable contents, such as liquids, semi-liquids, solids or semi-solids. The anchoring apparatus could also function as a container device that holds another container, such as a can or bottle anchoring apparatus that holds a beverage can or bottle.

Accordingly, a universal quick-release anchor member has been disclosed, along with anchoring apparatus that incorporate the anchor member. Reference in the present disclosure to an "embodiment" means that a particular feature, structure or characteristic described in connection with the embodiment may be included in at least one embodiment of the disclosed device. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples may be given throughout this description. These examples are merely descriptions of specific embodiments of the invention. The scope of the invention is not limited to the examples given.

As used in this application, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

Although example embodiments have been shown and described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. A universal releasable anchor member, comprising:
  a base seal member comprising a non-porous resilient material;
  the base seal member having a seal member upper side, a seal member lower side, and a seal member peripheral edge defining an outer periphery of the seal member upper side and the seal member lower side;
  the seal member lower side being configured to engage an external reference surface and form a substantially airtight seal therewith that defines a controlled pressure zone, the controlled pressure zone comprising a region located between the seal member lower side and the reference surface;
  a vent port extending through the anchor member including between the seal member upper side and the seal member lower side;
  the vent port comprising a vent port upper end disposed on or above the seal member upper side and a vent port lower end disposed on the seal member lower side;
  an integral vent port closure member disposed proximate to the vent port upper end;
  the vent port closure member comprising a lower surface configured for mating engagement with a landing zone at the vent port upper end to form an airtight seal therewith that blocks airflow through the vent port;
  the vent port closure member being biased to move from a closed position to an open position;
  the closed position of the vent port closure member comprising the vent port closure member being arranged to block the vent port upper end and prevent a passage of air through the vent port to thereby close the controlled pressure zone and render it airtight; and
  the open position of the vent port closure member comprising the vent port closure member being arranged to unblock the vent port upper end and allow the passage of air through the vent port to thereby vent the controlled pressure zone.

2. The device of claim 1, wherein the vent port closure member is integrally formed as part of the anchor member.

3. The device of claim 2, wherein the vent port closure member is connected to the anchor member via a living hinge.

4. The device of claim 3, wherein the vent port closure member comprises a substantially planar upper surface.

5. The device of claim 4, wherein the vent port closure member comprises a substantially planar lower surface configured for mating engagement with a substantially planar landing zone that surrounds the vent port upper end.

6. The device of claim 4, wherein the vent port closure member comprises a lower surface having a plug protrusion configured for mating engagement with a plug recess formed in the vent port upper end.

7. The device of claim 6, wherein the plug protrusion tapers inwardly in a downward direction, and the plug recess tapers outwardly in an upward direction.

8. The device of claim 6, wherein the plug protrusion is stepped inwardly in a downward direction, and the plug recess is stepped outwardly in an upward direction.

9. The device of claim 4, wherein the vent port closure member comprises a lower surface having a ring protrusion configured for mating engagement with a ring depression formed in a landing zone that surrounds the vent port upper end.

10. The device of claim 9, wherein the vent port closure member lower surface comprises two or more of the ring protrusions and the landing zone comprises two or more of the ring depressions.

11. The device of claim 1, wherein:
  the anchor member comprises an anchor member stem having a stem lower end disposed on the seal member upper side and raised stem upper end disposed above the stem lower end;
  the vent port extends through the anchor member stem; and
  the vent port upper end and the vent port closure member are disposed on the stem upper end.

12. The device of claim 11, wherein the anchor member stem comprises a stem mounting portion configured for mounting the anchor member to an auxiliary component.

13. The device of claim 12, wherein the anchor member stem is configured to be received in an opening of the auxiliary component, and wherein the stem mounting portion comprises one or more projections that engage the opening in the auxiliary component.

14. The device of claim 13, wherein the stem mounting portion comprises an annular groove and the one or more projections comprise one or both sidewalls of the groove.

15. The device of claim 1, wherein the anchor member is configured as a suction seal stabilizer that applies a suction force to a surface on which the anchor member rests only when the base seal member is deformed from an initial rest position on the surface in which there is no suction force.

16. The device of claim 1, wherein the anchor member is operable as a suction cup that that applies a suction force to a surface on which the anchor member rests whenever the base seal member is pressed onto the surface so as to flatten the seal member lower surface.

17. The device of claim 1, in combination with one or more auxiliary components.

18. The device of claim 17, wherein the one or more auxiliary components comprise:
a first auxiliary component mounted to the seal member;
a second auxiliary component movably connected to the first auxiliary assembly member and movable between a lower position and an upper position;
the lower position comprising the second auxiliary component engaging the vent port closure member and forcing it into its closed position; and
the upper position comprising the second auxiliary component releasing the vent port closure member from its closed position to its open position.

19. A universal releasable anchor member, comprising:
a base seal member comprising a non-porous resilient material;
the base seal member having a seal member upper side, a seal member lower side, and a seal member peripheral edge defining an outer periphery of the seal member upper side and the seal member lower side;
the seal member lower side being configured to engage an external reference surface and form a substantially airtight seal therewith that defines a controlled pressure zone, the controlled pressure zone comprising a region located between the seal member lower side and the reference surface;
a vent port extending through the anchor member including between the seal member upper side and the seal member lower side;
the vent port comprising a vent port upper end disposed on or above the seal member upper side and a vent port lower end disposed on the seal member lower side;
a vent port closure member disposed proximate to the vent port upper end;
the vent port closure member comprising a lower surface configured for mating engagement with a landing zone at the vent port upper end to form an airtight seal therewith that blocks airflow through the vent port;
the vent port closure member being biased to move from a closed position to an open position;
the closed position of the vent port closure member comprising the vent port closure member being arranged to block the vent port upper end and prevent a passage of air through the vent port to thereby close the controlled pressure zone and render it airtight;
the open position of the vent port closure member comprising the vent port closure member being arranged to unblock the vent port upper end and allow the passage of air through the vent port to thereby vent the controlled pressure zone;
the vent port closure member being integrally formed as part of the anchor member and connected thereto via a living hinge; and
the vent port closure member comprising a lower surface configured for mating engagement with one or more of (1) a planar landing zone that surrounds the vent port upper end, (2) a recess formed in the vent port upper end, or (3) depression formed in a landing zone that surrounds the vent port upper end.

20. A universal releasable anchor member, comprising:
a flexible seal member comprising a non-porous resilient material;
the flexible seal member having a seal member upper side, a seal member lower side, and a seal member peripheral edge defining an outer periphery of the seal member upper side and the seal member lower side;
the seal member lower side being configured to engage an external reference surface and form a substantially airtight seal therewith that defines a controlled pressure zone, the controlled pressure zone comprising a region located between the seal member lower side and the reference surface;
a vent port extending through the anchor member including between the seal member upper side and the seal member lower side;
the vent port comprising a vent port upper end disposed on or above the seal member upper side and a vent port lower end disposed on the seal member lower side;
a vent port closure member disposed proximate to the vent port upper end;
the vent port closure member comprising a lower surface configured for mating engagement with a landing zone at the vent port upper end to form an airtight seal therewith that blocks airflow through the vent port;
the vent port closure member being biased to move from a closed position to an open position;
the closed position of the vent port closure member comprising the vent port closure member being arranged to block the vent port upper end and prevent a passage of air through the vent port to thereby close the controlled pressure zone and render it airtight;
the open position of the vent port closure member comprising the vent port closure member being arranged to unblock the vent port upper end and allow the passage of air through the vent port to thereby vent the controlled pressure zone;
an anchor member stem having a stem lower end disposed on the seal member upper side and a raised stem upper end disposed above the stem lower end;
the vent port extending through the anchor member stem;
the vent port upper end and the vent port closure member being disposed on the stem upper end;
the anchor member stem comprising a stem mounting portion configured for mounting the seal member to an auxiliary component; and
the anchor member stem being configured to be received in an opening of the auxiliary component, the stem mounting portion comprising one or more projections that engage the opening in the auxiliary component.

* * * * *